(12) United States Patent
Ni

(10) Patent No.: US 9,713,163 B2
(45) Date of Patent: Jul. 18, 2017

(54) METHOD FOR SCHEDULING ACCESS POINT OF WIRELESS LOCAL AREA NETWORK, CONTROLLER, ACCESS POINT, AND SYSTEM

(71) Applicant: Huawei Technologies Co., Ltd., Shenzhen (CN)

(72) Inventor: Rui Ni, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 14/924,500

(22) Filed: Oct. 27, 2015

(65) Prior Publication Data

US 2016/0050684 A1    Feb. 18, 2016

Related U.S. Application Data

(63) Continuation of application No. PCT/CN2013/088747, filed on Dec. 6, 2013.

(30) Foreign Application Priority Data

May 10, 2013 (CN) .......................... 2013 1 0172753

(51) Int. Cl.
*H04W 4/00* (2009.01)
*H04W 72/12* (2009.01)
(Continued)

(52) U.S. Cl.
CPC ....... *H04W 72/1205* (2013.01); *H04W 28/16* (2013.01); *H04L 5/0091* (2013.01); *H04W 84/12* (2013.01)

(58) Field of Classification Search
CPC . H04W 28/16; H04W 84/12; H04W 72/1205; H04L 5/0091
(Continued)

(56) References Cited

U.S. PATENT DOCUMENTS

2003/0206532 A1    11/2003 Shpak
2003/0207699 A1    11/2003 Shpak
(Continued)

FOREIGN PATENT DOCUMENTS

CN         101998601 A    3/2011
WO    WO 2012034702 A1    3/2012

OTHER PUBLICATIONS

Mhatre et al., "Interference Mitigation through Power Control in High Density 802.11 WLANs," IEEE Infocom, pp. 535-543, Institute of Electrical and Electronics Engineers, New York, New York (May 6-12, 2007).

*Primary Examiner* — Faisal Choudhury
(74) *Attorney, Agent, or Firm* — Leydig, Voit & Mayer, Ltd.

(57) ABSTRACT

The present invention relates to a method for scheduling an access point of a wireless local area network, including: receiving, by a first controller in a current scheduling period of a network running state, performance statistical data of a last scheduling period reported by a plurality of access points in a first access point cluster in the last scheduling period, where the first access point cluster includes the first controller and the plurality of access points connected to the first controller; generating a scheduling scheme for the plurality of access points for a next scheduling period according to the performance statistical information; and broadcasting the scheduling scheme to the plurality of access points. According to the method, impact on other access points due to communications between different access points and user equipments are reduced in a wireless local area network with a plurality of access points.

18 Claims, 18 Drawing Sheets

(51) Int. Cl.
*H04W 28/16* (2009.01)
*H04L 5/00* (2006.01)
*H04W 84/12* (2009.01)

(58) Field of Classification Search
USPC .......................................................... 370/329
See application file for complete search history.

(56) References Cited

U.S. PATENT DOCUMENTS

| | | |
|---|---|---|
| 2011/0142019 A1 | 6/2011 | Bharghavan et al. |
| 2012/0007790 A1 | 1/2012 | Shtrom et al. |
| 2012/0039259 A1 | 2/2012 | Kish et al. |
| 2013/0208589 A1* | 8/2013 | Lopez Toledo ..... H04W 72/087 370/230 |
| 2014/0198741 A1* | 7/2014 | Barriac ............... H04W 74/006 370/329 |
| 2015/0319644 A1* | 11/2015 | Grunenberger ......... H04L 69/22 370/338 |

* cited by examiner

METHOD FOR SCHEDULING ACCESS POINT OF WIRELESS LOCAL AREA NETWORK, CONTROLLER, ACCESS POINT, AND SYSTEM

CROSS-REFERENCE TO RELATED APPLICATIONS

This application is a continuation of International Patent Application No. PCT/CN2013/088747, filed on Dec. 6, 2013, which claims priority to Chinese Patent Application No. 201310172753.6, filed on May 10, 2013, both of which are hereby incorporated by reference in their entireties.

TECHNICAL FIELD

The present invention relates to the technical field of wireless communications and, in particular, to a method for scheduling an access point of a wireless local area network, a controller, an access point, and a system.

BACKGROUND

A wireless local area network (WLAN) has been applied more and more widely, a WLAN with a single access point (AP) cannot meet access requirements of user equipments in a large coverage area, thus a WLAN with a plurality of access points provided within the coverage area appears, where the plurality of APs that belong to the same WLAN work at a same channel frequency, as shown in FIG. 1, when different user equipments perform concurrent communications with the APs, since there are wireless signal collisions, a bandwidth allocated to each user equipment may not increase due to increase of the number of APs, but will decline.

In order to reduce impact on user equipments communicating with other APs due to the communication between a single user equipment and an AP, as shown in FIG. 2, the prior art provides a wireless local area network directional beam technical solution, this solution lies in that different antenna configuration scheduling schemes are driven by a destination address of a data packet that needs to be transmitted, and an antenna transmission mode of an access point is modified from an omni-directional manner to a directional manner through the antenna configuration scheme, thereby enhancing transmitting power of a radio signal in a particular direction, and correspondingly reducing transmitting energy of radio signals in other directions, and thus objectively reducing impact on other user equipments which communicate with the access point concurrently. However, in a WLAN system with a plurality of APs, it will still make a great impact on concurrent communications of user equipments in an area which is served by other APs, and thus network throughput of a wireless local area network with a plurality of APs will be affected.

SUMMARY

An objective of the present invention is to provide a method for scheduling an access point of a wireless local area network, so as to reduce the impact on other access points in a wireless local area network with a plurality of access points due to communications between different access points and user equipments, and thus enhance access rate of the wireless local area network.

In order to achieve the above-described objective, in a first aspect, embodiments of the present invention provide a method for scheduling an access point of a wireless local area network, the method includes:

receiving, by a first controller in a current scheduling period of a network running state, performance statistical data of a last scheduling period reported by a plurality of access points in a first access point cluster in the last scheduling period, where the first access point cluster includes the first controller and the plurality of access points connected to the first controller;

generating a scheduling scheme of the plurality of access points for a next scheduling period according to the performance statistical information; and broadcasting the scheduling scheme to the plurality of access points, to enable the plurality of access points to configure, in the current scheduling period, a transmitting parameter in the next scheduling period according to the scheduling scheme, and communicate with a user equipment according to the transmitting parameter, where the transmitting parameter includes an antenna direction, an upper limit of transmitting power, and a clear channel assessment parameter threshold.

Preferably, before the network running state, further including:

generating, by the first controller in an initialization phase, prior information according to receive signal strength indicators reported by access points controlled by the first controller, where the prior information is used for generating a scheduling scheme for a first scheduling period and a second scheduling period, and the first scheduling period and the second scheduling period are a first one and a second one scheduling period in the running state.

Preferably, the generating in the initialization phase, by the first controller, the prior information according to the receive signal strength indicators reported by the access points controlled by the first controller specifically includes:

establishing, by the first controller, connections with the plurality of access points to form the first access point cluster;

instructing, by the first controller, the first access point cluster that the access points in the first access point cluster take turns to transmit a training sequence, and other access points which are not instructed receive the training sequence;

receiving receive signal strength indicator which is generated and reported by each access point based on the training sequence transmitted other access points; and after all the access points in the access point cluster have transmitted the training sequence, generating the prior information according to the receive signal strength indicator transmitted by each access point.

Preferably, in the initialization phase, further including: establishing, by the first controller, a connection with at least one second controller to form a controller group, where each control device in the controller group controls an access point cluster.

Preferably, after the generating, by the first controller in the initialization phase, the prior information according to the receive signal strength indicators reported by the access points controlled by the first controller, where the prior information is used for generating the scheduling scheme for the first scheduling period and the second scheduling period;

further including:

negotiating, by the first controller, with other controllers in the controller group to determine a scheduling scheme of an access point cluster corresponding to each controller for the first scheduling period and the second scheduling period.

Preferably, the negotiating, by the first controller, with the other controllers in the controller group to determine the scheduling scheme of the access point cluster corresponding to each controller, specifically including:

notifying, by each controller, the other controllers in the controller group of a scheduling scheme of an access point cluster corresponding to the controller;

determining, by each controller, according to the receive signal strength indicators received in the initialization phase, whether there are overlapped coverage areas between an access point cluster to which the controller belongs and access point clusters to which the other controllers belong; and if there isn't any overlapped coverage area, then determining a current scheduling scheme as the scheduling scheme for the first scheduling period and the second scheduling period.

Preferably, after the determining, by each controller, according to the receive signal strength indicators received in the initialization phase, whether there are overlapped coverage areas between the access point cluster to which the controller belongs and the access point clusters to which the other controllers belong, if there are overlapped coverage areas, then analyzing, by each controller, scheduling schemes transmitted by the other controllers, and determining collision probabilities between a scheduling scheme for the current access point cluster and the scheduling scheme for the other access point clusters according to the scheduling scheme;

setting a priority for the controller when a collision probability exceeds a set threshold; and querying different access point clusters having a collision, and adjusting scheduling schemes for access point clusters with relatively low priorities.

Preferably, the setting the priority for the controller when the collision probability exceeds the set threshold, specifically is setting a priority according to data quantity of data waiting to be transmitted by the access points in each access point cluster.

Preferably, the determining, by each controller, whether there is the overlapped coverage area between the access point cluster to which the controller belongs and the access point clusters to which the other controllers belong according to the receive signal strength indicators received in the initialization phase, specifically including:

determining that there is the overlapped coverage area between the two access point clusters, when any access point in the access point cluster to which a control belongs receives a training sequence transmitted by an access point in another access point cluster and the received receive signal strength indicator of the training sequence exceeds a preset threshold.

Preferably, after the generating the scheduling scheme of the plurality of access points for the next scheduling period according to the performance statistical information, further including:

exchanging, by the first controller, information with other controllers in a controller group, where the controller group includes at least two connected controllers, and the exchanged information includes the scheduling scheme for the next scheduling period generated by the controller; and modifying the scheduling scheme for the next scheduling period according to data of overlapped coverage areas between the access points in the first access point cluster and access points in other access point clusters.

In a second aspect, embodiments of the present invention provide a method for scheduling an access point of a wireless local area network, the method includes:

reporting, by a first access point in a current scheduling period of a network running state, performance statistical data of a last scheduling period to a first controller in a first access point cluster, where the first access point cluster includes the first controller and a plurality of access points connected to the first controller;

receiving a scheduling scheme for a next scheduling period generated by the first controller according to the performance statistical information;

configuring a transmitting parameter in the next scheduling period according to the scheduling scheme, where the transmitting parameter includes an antenna direction, an upper limit of transmission power, and a clear channel assessment parameter threshold; and performing a communication with a user equipment according to the transmitting parameter in the next scheduling period.

Preferably, before the network running state, further including:

transmitting, by the first access point to the first controller in an initialization phase, receive signal strength indicator of training sequences transmitted by a plurality of second access points controlled by the first controller, to enable the first controller to generate prior information according to the receive signal strength indicators, where the prior information is used for generating a scheduling scheme for a first scheduling period and a second scheduling period, and the first scheduling period and the second scheduling period are a first one and a second one scheduling period in the running state.

Preferably, the transmitting, by the first access point to the first controller in the initialization phase, the receive signal strength indicator of the training sequences transmitted by the plurality of second access points controlled by the first controller, to enable the first controller to generate the prior information according to the receive signal strength indicators, specifically including:

connecting, by the first access point, to the first controller, where a plurality of access points connected to the first controller form a first access point cluster;

listening to broadcast information transmitted by the first controller;

if the broadcast information notifies the first access point to transmit a training sequence, then generating the training sequence, and transmitting the training sequence;

if the broadcast information does not notify the first access point to transmit a training sequence, then listening, by the first access point, to a wireless channel, and transmitting receive signal strength indicator of a training sequence to the first controller after receiving the training sequence transmitted by other access points in the first access point cluster, to enable the first controller generates the prior information according to receive signal strength indicator transmitted by each access point after all access points in the first access point cluster have transmit training sequences In a third aspect, embodiments of the present invention provide a controller for scheduling an access point of a wireless local area network, the controller includes:

a receiving module, configured to receive, in a current scheduling period of a network running state, performance statistical data of a last scheduling period reported by a plurality of access points in a first access point cluster in the last scheduling period, where the first access point cluster includes the controller and the plurality of access points connected to the controller;

a processing module, configured to generate a scheduling scheme of the plurality of access points for a next scheduling period according to the performance statistical information; and a transmitting module, configured to broadcast the scheduling scheme to the plurality of access points, to enable the plurality of access points to configure, in the current scheduling period, a transmitting parameter in the next scheduling period according to the scheduling scheme, and communicate with a user equipment according to the transmitting parameter, where the transmitting parameter includes an antenna direction, an upper limit of transmitting power, and a clear channel assessment parameter threshold.

Preferably, the processing module is further configured to:

generate, in an initialization phase, prior information according to receive signal strength indicators reported by access points, where the prior information is used for generating a scheduling scheme for a first scheduling period and a second scheduling period, and the first scheduling period and the second scheduling period are a first one and a second one scheduling period in the running state.

Preferably, the processing module is specifically configured to, in the initialization phase:

establish connections with the plurality of access points to form the first access point cluster;

instruct the first access point cluster that access points in the first access point cluster take turns to transmit a training sequence, and other access points which are not instructed receive the training sequence;

receive receive signal strength indicator which is generated and reported by each access point based on the training sequence transmitted by other access points; and after all the access points in the access point cluster have transmitted the training sequence, generate the prior information according to the receive signal strength indicator transmitted by each access point.

Preferably, the processing module is further configured to, in the initialization phase: form a controller group by establishing a connection with other controllers, where each control device in the controller group controls an access point cluster.

Preferably, in the initialization phase, the processing module is further configured to generate the prior information according to the receive signal strength indicators reported by the access points controlled by the controller, where the prior information is used for generating the scheduling scheme for the first scheduling period and the second scheduling period;

then negotiate with other controllers in the controller group to determine a scheduling scheme for an access point cluster corresponding to each controller for the first scheduling period and the second scheduling period.

Preferably, the processing module is specifically configured to:

notify the other controllers in the controller group of a scheduling scheme for an access point cluster corresponding to the controller;

determine, according to the receive signal strength indicators received in the initialization phase, whether there are overlapped coverage areas between an access point cluster to which the controller belongs and access point clusters to which the other controllers belong; and if there isn't any overlapped coverage area, then determine a current scheduling scheme as the scheduling scheme for the first scheduling period and the second scheduling period.

Preferably, the processor module is configured to, after determining, according to the receive signal strength indicators received in the initialization phase, whether there are overlapped coverage areas between the access point cluster to which the controller belongs and the access point clusters to which the other controllers belong, if there are overlapped coverage areas, then analyze scheduling schemes transmitted by the other controllers, and determines collision probabilities between a scheduling scheme for the current access point cluster and the scheduling schemes for the other access point clusters according to the scheduling scheme;

set a priority for the controller when a collision probability exceeds a set threshold; and query different access point clusters having a collision, and adjust scheduling schemes for access point clusters with relatively low priorities.

Preferably, the setting, by the processing module, the priority for the controller when the collision probability exceeds the set threshold, specifically is setting a priority according to quantity of data waiting to be transmitted by the access points in each access point cluster.

Preferably, the processing module is configured to determine that there is the overlapped coverage area between the two access point clusters, when any access point in the access point cluster to which a control belongs receives a training sequence transmitted by an access point in another access point cluster and the received receive signal strength indicator of the training sequence exceeds a preset threshold.

Preferably, the processing module is further configured to, after generating the scheduling scheme of the plurality of access points for the next scheduling period according to the performance statistical information, exchange information with other controllers in a controller group, where the controller group includes at least two connected controllers, and the exchanged information includes the scheduling scheme for the next scheduling period generated by the controller; and modify the scheduling scheme for the next scheduling period according to data of overlapped coverage areas between the access points in the first access point cluster and access points in other access point clusters.

In a fourth aspect, embodiments of the present invention provide an access point of a wireless local area network, the access point includes:

a reporting module, configured to report, in a current scheduling period of a network running state, performance statistical data of a last scheduling period to a first controller in a first access point cluster, where the first access point cluster includes the first controller and a plurality of access points connected to the first controller;

a receiving unit, configured to receive a scheduling scheme for a next scheduling period generated by the first controller according to the performance statistical information;

a processing unit, configured to configure a transmitting parameter in the next scheduling period according to the scheduling scheme, where the transmitting parameter includes an antenna direction, an upper limit of transmitting power, and a clear channel assessment parameter threshold; and a wireless transmission unit, configured to perform a communication with a user equipment according to the transmitting parameter in the next scheduling period.

Preferably, the reporting unit is further configured to:

transmit, to the first controller in an initialization phase, receive signal strength indicator of training sequences transmitted by other access points controlled by the first controller, to enable the first controller to generate prior information according to the receive signal strength indicators, where the prior information is used for generating a scheduling scheme for a first scheduling period and a second scheduling period, and the first scheduling period and the second scheduling period are a first one and a second one scheduling period in the running state.

Preferably, the access point further includes:

a connection establishing unit, configured to connect to the first controller, where a plurality of access points connected to the first controller form a first access point cluster;

a listening unit, configured to listen to broadcast information transmitted by the first controller; and a training sequence generating unit, configured to:

if the broadcast information notifies the access point to transmit a training sequence, generate the training sequence and transmit the training sequence via the wireless transmission unit;

if the broadcast information does not notify the access point to transmit a training sequence, then the access point listens to a wireless channel, and transmits receive signal strength indicator of a training sequence to the first controller via the reporting unit after receiving the training sequence transmitted by other access points in the first access point cluster via the wireless transmission unit, to enable the first controller generates the prior information according to receive signal strength indicator transmitted by each access point after all access points in the first access point cluster have transmit training sequences.

In a fifth aspect, embodiments of the present invention provide a system for scheduling an access point of a wireless local area network, the system includes a controller for scheduling an access point of a wireless local area network according to the third aspect provided in embodiments of the present invention and an access point of a wireless local area network according to the fourth aspect provided in embodiments of the present invention.

In a sixth aspect, embodiments of the present invention provide a controller for scheduling an access point of a wireless local area network, the controller includes:

a network interface;

a processor;

a memory; and an application program physically stored in the memory, where the application program includes instructions used for causing the processor and the system to perform following procedures:

controlling, in a current scheduling period of a network running state, the network interface to receive performance statistical data of a last scheduling period reported by a plurality of access points in a first access point cluster in the last scheduling period, where the first access point cluster includes the controller and the plurality of access points connected to the controller;

generating a scheduling scheme of the plurality of access points for a next scheduling period according to the performance statistical information; and broadcasting the scheduling scheme to the plurality of access points via the network interface, to enable the plurality of access points to configure, in the current scheduling period, a transmitting parameter in the next scheduling period according to the scheduling scheme, and communicate with a user equipment according to the transmitting parameter, where the transmitting parameter includes an antenna direction, an upper limit of transmitting power, and a clear channel assessment parameter threshold.

Preferably, the processor generates in an initialization phase, prior information according to receive signal strength indicators reported by access points controlled by the controller, where the prior information is used for generating a scheduling scheme for a first scheduling period and a second scheduling period, and the first scheduling period and the second scheduling period are a first one and a second one scheduling period in the running state.

Preferably, after generating the scheduling scheme for the plurality of access points for the next scheduling period according to the performance statistical information, the processor further controls the network interface to exchange information with other controllers in a controller group, where the controller group includes at least two connected controllers, and the exchanged information includes the scheduling scheme for the next scheduling period generated by the controller; and modify the scheduling scheme for the next scheduling period according to data of overlapped coverage areas between the access points in the first access point cluster and access points in other access point clusters.

In a seventh aspect, embodiments of the present invention provide an access point of a wireless local area network, the access point includes:

a network interface;

a processor;

a memory; and an application program physically stored in the memory, where the application program includes instructions used for causing the processor and the system to perform following procedures:

controlling the network interface to report, in a current scheduling period of a network running state, performance statistical data of a last scheduling period to a first controller in a first access point cluster, where the first access point cluster includes the first controller and a plurality of access points connected to the first controller;

receiving a scheduling scheme for a next scheduling period generated by the first controller according to the performance statistical information via the network interface;

configuring a transmitting parameter in the next scheduling period according to the scheduling scheme, where the transmitting parameter includes an antenna direction, an upper limit of transmitting power, and a clear channel assessment parameter threshold; and performing a communication with a user equipment according to the transmitting parameter in the next scheduling period via the network interface.

Preferably, the application program includes instructions used for causing the processor and the network interface to perform following procedures:

transmitting to the first controller in an initialization phase, receive signal strength indicator of training sequences transmitted by a plurality of second access points controlled by the controller via the network interface, to enable the controller to generate prior information according to the receive signal strength indicators, where the prior information is used for generating a scheduling scheme for a first scheduling period and a second scheduling period, and the first scheduling period and the second scheduling period are a first one and a second one scheduling period in the running state.

Preferably, the transmitting to the first controller in the initialization phase, the receive signal strength indicator of the training sequences transmitted by the plurality of second access points controlled by the controller via the network interface, to enable the controller to generate the prior information according to the receive signal strength indicators, specifically including:

connecting to the first controller via the network interface, where a plurality of access points connected to the first controller form a first access point cluster;

listening, by the network interface, to broadcast information transmitted by the first controller;

if the broadcast information notifies the first access point to transmit a training sequence, then generating the training sequence, and transmitting the training sequence;

if the broadcast information does not notify the first access point to transmit a training sequence, then listening, by the network interface, to a wireless channel, and transmitting receive signal strength indicator of a training sequence to the first controller after receiving the training sequence transmitted by other access points in the first access point cluster, to enable the first controller generates the prior information according to receive signal strength indicator transmitted by each access point after all access points in the first access point cluster have transmit training sequences.

In an eighth aspect, embodiments of the present invention provide a system for scheduling an access point of a wireless local area network, the system includes a controller for scheduling an access point of a wireless local area network according to a controller for scheduling an access point of a wireless local area network provided in the sixth aspect of embodiments of the present invention and an access point of a wireless local area network provided in the seventh aspect of embodiments of the present invention.

In a method for scheduling an access point of a wireless local area network according to embodiments of the present invention, a controller in a wireless local area network receives, in a current scheduling period of a network running state, performance statistical data of a last scheduling period reported by a plurality of access points in a first access point cluster in the last scheduling period, generates a scheduling scheme for the plurality of access points in one access point cluster for a next scheduling period according to the performance statistical information, and broadcasts the generated scheduling scheme to the plurality of access points in an access point cluster, to enable the plurality of access points to configure a transmitting parameter in the next scheduling period according to the scheduling scheme, where the transmitting parameter includes an antenna direction, an upper limit of transmission power and a clear channel assessment parameter threshold, and communicate with a user equipment according to the transmitting parameter. According to embodiments of the present invention, the impact on other access points due to communications between different access points and user equipments can be reduced in a wireless local area network with a plurality of access points, thereby improving an access rate of the wireless local area network.

BRIEF DESCRIPTION OF DRAWINGS

In order to make technical solutions in embodiments of the present invention clearer, accompanying drawings used in the description of embodiments of the present invention or the prior art will be briefly described hereunder. Obviously, the described drawings are merely some embodiments of present invention. For persons skilled in the art, other drawings may be obtained based on these drawings without any creative effort.

DESCRIPTION OF EMBODIMENTS

Technical solutions of the present invention will be further described in detail with reference to accompanying drawings and embodiments.

A method and a system for scheduling an access point of a wireless local area network according to embodiments of the present invention apply to a scenario where coverage is relatively large and a single access point cannot meet the requirement, for instance, an office having at least one floor, where a plurality of access points may be configured in one floor, and these access points APs are connected to a same controller via a local area network interconnection device (such as a switch), and the plurality of access points connected to the same controller form an access point cluster; in a case that there are a plurality of floors, a access point cluster may be formed in each floor separately, and controllers at different floors then form a controller group via a network interconnection device (such as a switch). These APs working at a same channel frequency may be used to provide wireless network coverage for user WiFi equipments at this floor, however, adjacent APs are separated by a relatively short distance, there are a great number of overlapped coverage areas between the APs at the same channel frequency, thus, when a user equipment or a mobile station needs to access to the wireless network, due to the existence of interference and competition, it may need to optimize a scheduling scheme for access points in a same access point cluster and coordinate a scheduling scheme for access points in a same controller group by means of a method for scheduling an access point of a wireless local area network according to embodiments of the present invention, thereby improving concurrency of the access points at the same channel frequency, and increasing network throughput.

Figure 4:
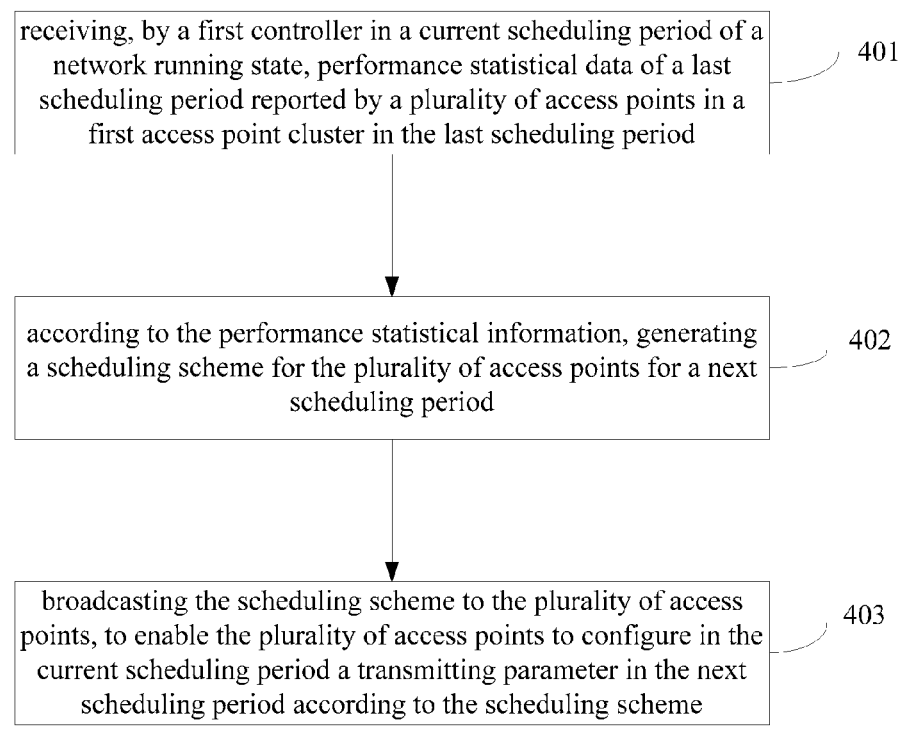
FIG. 4 is a flow chart of a scheduling method of a wireless local area network according to an embodiment of the present invention.

FIG. 4 is a flow chart of a method for scheduling an access point of a wireless local area network according to an embodiment of the present invention, where an entity executing this embodiment is a controller, or called as a control device, or a control apparatus, it can be seen from FIG. 4 that, the method includes:

401, receiving, by a first controller in a current scheduling period of a network running state, performance statistical data of a last scheduling period reported by a plurality of access points in a first access point cluster in the last scheduling period, where the first access point cluster includes the first controller and the plurality of access points connected to the first controller;

Specifically, in this embodiment, there is only one access point cluster in the wireless local area network. According to system configuration of the wireless local area network, working time of the wireless local area network in a normal running state is divided into consecutive scheduling periods, and access points are scheduled according to different scheduling schemes in different scheduling periods. In each scheduling period, a controller receives performance statistical data of a last scheduling period reported by access points in an access point cluster corresponding to the controller, where the performance statistical data includes but is not limited to following information of each access point in the last scheduling period: throughput, an average length of a backoff window, an average length of a transmit data cache queue, average receive signal strength indicator (RSSI) of received uplink signals from a user equipment, and an average RSSI of received broadcast frames from other access points.

402, according to the performance statistical information, generating a scheduling scheme for the plurality of access points for a next scheduling period;

Specifically, the scheduling scheme may be a group of parallel configuration matrices, where each configuration matrix corresponds to one access point, and an element in each configuration matrix represents a parameter, which includes but is not limited to an antenna configuration parameter, a transmitting power parameter, a clear channel assessment (CCA) parameter and an access point on and off parameter, where the antenna configuration parameter is used for adjusting an antenna beam direction of an access point, the transmitting power parameter is used for controlling an intensity of transmitting power, the CCA parameter is a physical layer receiving sensitivity threshold of a wireless local area network device, for instance, CCA=−60 dBm indicates that the wireless local area network access device determines that a current channel is in a busy state when an intensity of wireless signals received by the access device is greater than or equal to −60 dBm, then the wireless local area network access device performs a backoff algorithm according to a carrier sense multiple access with collision avoidance (CSMA/CA) rule, and stops transmitting data during the period that the channel is busy; the access point on and off parameter is to control an access point to be silent or be able to transmit data in a scheduling period.

More specifically, in this step, the generating the scheduling scheme for the plurality of access points for the next scheduling period by the controller according to the performance statistical information, usually is performing a fine-tuning to a scheduling scheme for a last scheduling period.

Figure 4A:
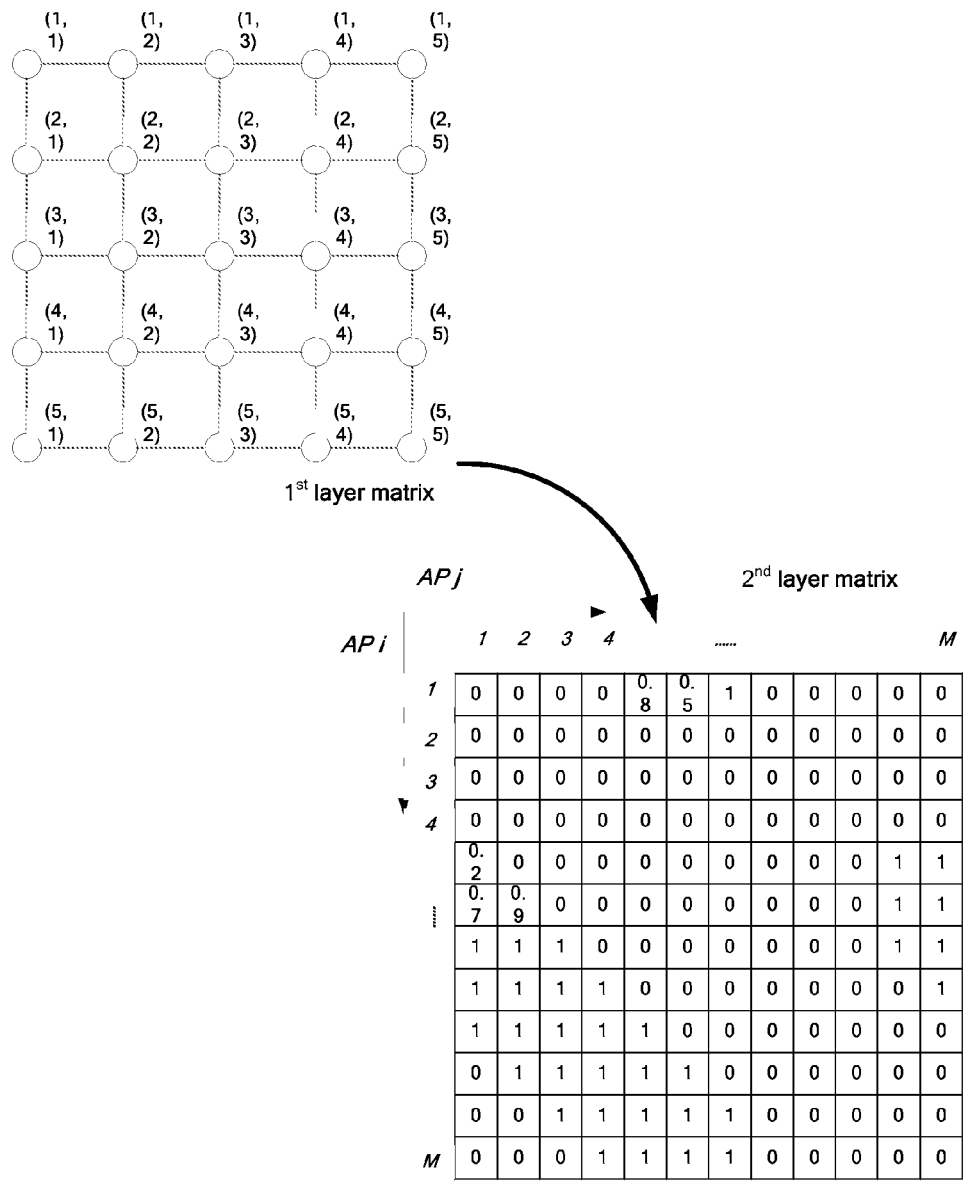
FIG. 4A is a schematic diagram of prior information in a scheduling method of a wireless local area network according to an embodiment of the present invention.

A specific implementation that the generating the scheduling scheme for the plurality of access points for the next scheduling period according to the performance statistical information is usually performing a fine-tuning to the scheduling scheme for the last scheduling period will be described hereunder with reference to a specific application by taking FIG. 4A as an example.

In a communication system, prior information is expressed as a double-layer two-dimensional interference matrix, which is shown in the following drawings. The first layer is an N×N matrix, any element (i, j) represents a combination of $AP_i$ and $AP_j$. Elements on the first layer include a matrix pointer, pointing to an M×M matrix on the second layer. The second layer in a data structure of the interference matrix is $N^2$ M×M matrices. A value range of any element (m, n) of the matrix on the second layer is [0,1], meaning of the value is: when an sector m of $AP_i$ (equivalent to a wireless beam directionally transmitted by an antenna) and an sector n of $AP_j$ work simultaneously, a ratio of actual throughput of the sector m of $AP_i$ to peak throughput of a single working AP under ideal conditions. FIG. 4A merely represents a scenario of a WLAN with 5 APs for illustrations. In an initialization phase of the network, initial values of all elements of this matrix are set to 0.

When each scheduling period ends, each AP feedbacks its performance statistical information including throughput information in this round of period to the controller. The controller adjusts the interference matrix (that is, the prior information) generated in the initialization phase by using the fed back information, thereby obtaining a new interference matrix. A specific updating method lies in dividing actual throughput in the last round of period by theoretical peak throughput to obtain a decimal with a value range of [0,1], a physical meaning thereof is what percentage of each scheduled AP's capability actually take effect under the scheme for the last round of scheduling period. Then, the newly obtained decimal is used to replace a value of an element at a corresponding position in the double-layer two-dimensional matrix as shown in the above drawing.

Then, the controller generates a scheduling scheme for a next scheduling period according to the new interference matrix, in this scheduling scheme, a Greed Seek algorithm is preferably used to look for a suboptimal solution. Since a real-time system cannot tolerate the complexity and the relatively long computation cycle of a traversal algorithm for seeking an optimal solution, this scheduling algorithm uses the Greed Seek algorithm to seek the suboptimal solution.

During the procedure of seeking the suboptimal, a basis for determining whether a sector m of $AP_i$ and a sector n of $AP_j$ can work concurrently is whether sum of the element (m,n) and the element (n,m) of the interference matrix is greater than a particular threshold, for instance, in Embodiment 1, the threshold is 1.

The scheduling scheme for the next scheduling period is generated based on the Greed Seek algorithm, since an integral Greed Seek search process is a mature algorithm, thus it should not be interpreted as a limitation to embodiments of the present invention.

403, broadcasting the scheduling scheme to the plurality of access points, to enable the plurality of access points to configure in the current scheduling period a transmitting parameter in the next scheduling period according to the scheduling scheme, and communicate with a user equipment according to the transmitting parameter, where the transmitting parameter includes an antenna direction, an upper limit of transmitting power, and a clear channel assessment parameter threshold.

Specifically, after generating a scheduling scheme for an access point cluster, the controller broadcasts the scheduling scheme to all access points in the access point cluster via a wired link which consists of switches, and the access points then configure a transmitting parameter in a next scheduling period according to the scheduling scheme. Reference may be made to step 403 for details, which will not be repeated herein.

According to the embodiments, a controller is enabled to simultaneously generate scheduling schemes for a plurality of access points controlled by the controller, where the scheduling schemes include not only an antenna direction but also a CCA parameter and so on, thus, it can realize that, in a wireless local area network with a plurality of access points, impact on other access points due to the communications between different access points and user equipments are reduced, thereby improving an access rate of the wireless local area network.

In a possible implementation, before the network running state, the entire wireless local area network needs to be initialized, during the initialization procedure, the first controller generates in an initialization phase, prior information according to receive signal strength indicators reported by access points controlled by the first controller, where the prior information is used for generating a scheduling scheme for a first scheduling period and a second scheduling period, and the first scheduling period and the second scheduling period are a first one and a second one scheduling period in the running state.

Figure 5:
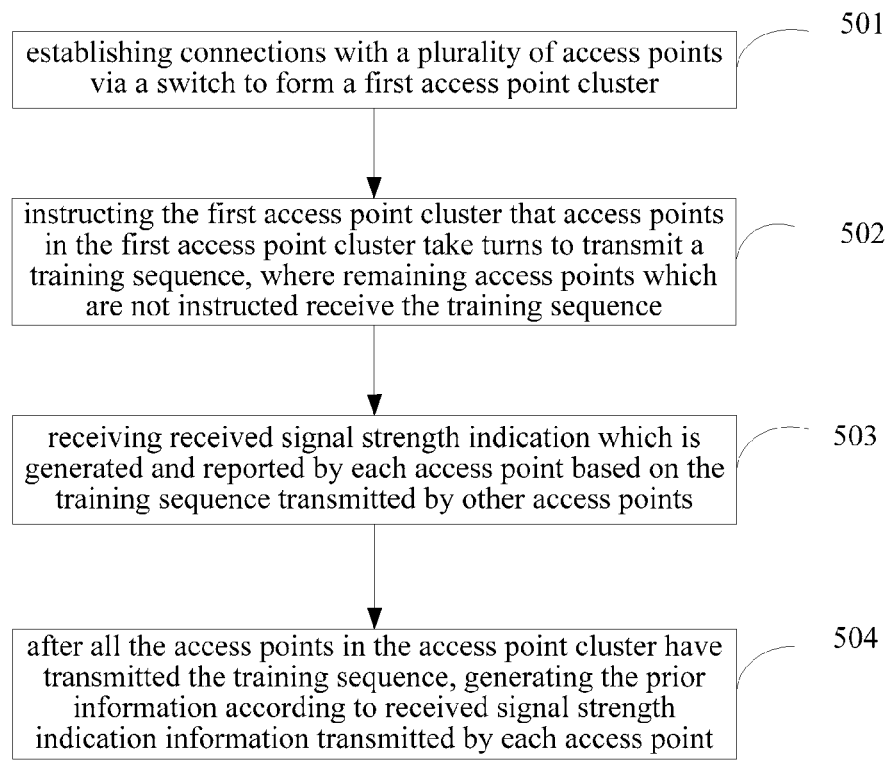
FIG. 5 is a flow chart of initialization of a wireless local area network according to an embodiment of the present invention.
Figure 6:
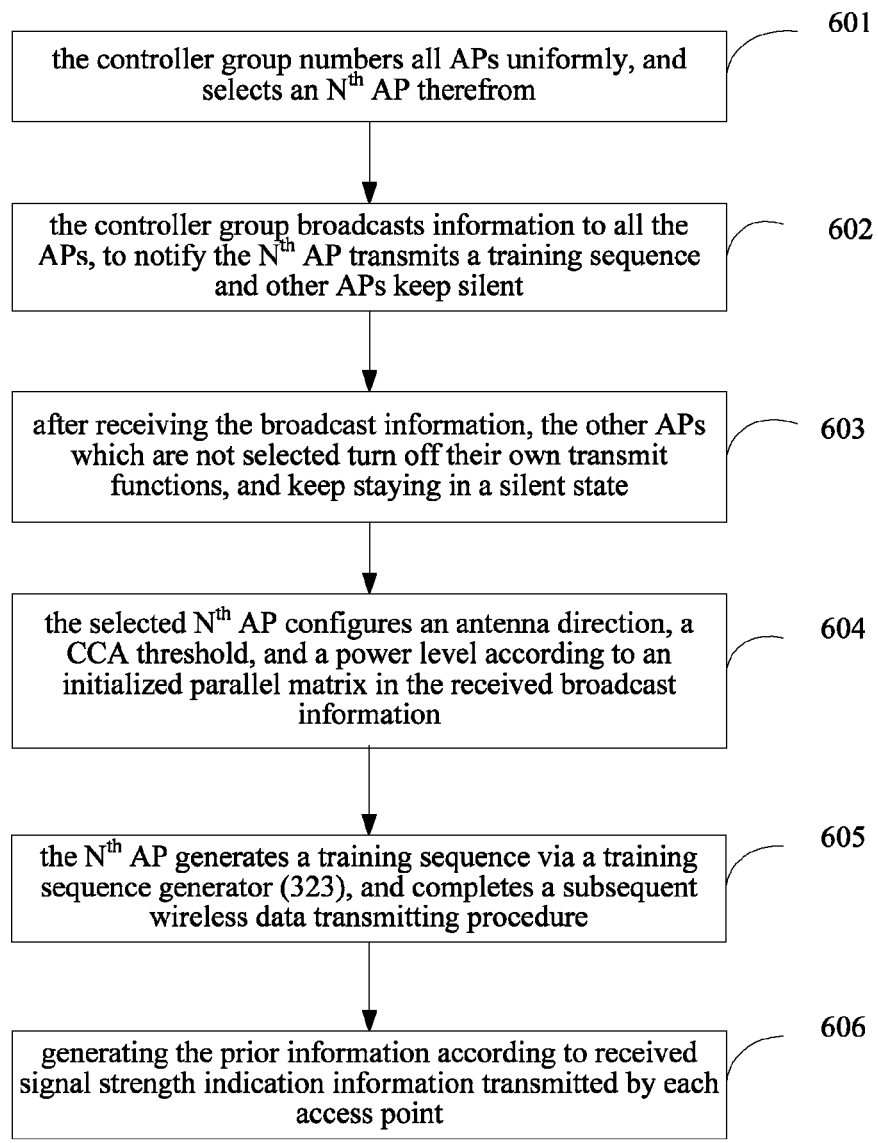
FIG. 6 is a training flow chart in an initialization phase of a controller in a wireless local area network.

More specifically, if the wireless local area network includes one controller, then the initialization step is as shown in FIG. 5, including:

501, establishing connections with a plurality of access points via a switch to form a first access point cluster;

Specifically, the controller may find MAC address information of a group of access points via a switch, and establish connection relations with the group of APs through signaling interactions to form an access point cluster.

502, instructing the first access point cluster that access points in the first access point cluster take turns to transmit a training sequence, where remaining access points which are not instructed receive the training sequence;

Specifically, after the access point cluster is formed, the controller generates an initialized parallel interference matrix, and instructs access points in the access point cluster formed in 501 to take turns to transmit the training sequence in different configurations.

This step may be further implemented via the following processes:

The controller numbers the APs in the access point cluster, and selected an $N^{th}$ AP therefrom;

The controller transmits a broadcast signal to all APs in the access point cluster, to inform all the APs that the $N^{th}$ AP is about to transmit a training sequence, and the other APs keep silent;

After receiving broadcast information, the APs except the $N^{th}$ AP turn off their own transmitting functions, and wait to listen to the training sequence;

Subsequently, the $N^{th}$ AP generates the training sequence according to a parameter configuration CCA threshold, a transmitting power and an antenna direction in the initialized parallel matrix, and completes an antenna transmitting procedure.

503, receiving receive signal strength indicator which is generated and reported by each access point based on the training sequence transmitted by other access points;

504, after all the access points in the access point cluster have transmitted the training sequence, generating the prior information according to receive signal strength indicator transmitted by each access point.

The controller switches to another AP to transmit a training sequence at intervals till all APs in the access point cluster have transmitted training sequences, and generates the prior information according to receive signal strength indicator transmitted by each access point, where the prior information is specifically a parallel interference matrix, which may act as an input parameter when generating a scheduling scheme.

In a possible implementation, if the wireless local area network includes not only one access point cluster, that is to say, there are more than one controllers in the wireless local area network, then the initialization step also includes: establishing, by the first controller, a connection with at least one second controller to form a controller group, where each control device in the controller group controls an access point cluster.

In this implementation, a method for generating the prior information in the initialization phase by the controller in the wireless local area network further includes:

601, the controller group numbers all APs uniformly, and selects an $N^{th}$ AP therefrom.

602, the controller group broadcasts information to all the APs to notify that the $N^{th}$ AP transmits a training sequence and other APs keep silent.

603, after receiving the broadcast information, the other APs which are not selected turn off their own transmit functions, and keep staying in a silent state. During the silent period, the APs will not transmit any data packet.

604, the selected $N^{th}$ AP configures an antenna direction, a CCA threshold, and a power level according to an initialized parallel matrix in the received broadcast information.

605, the $N^{th}$ AP generates a training sequence via a training sequence generator (323), and completes a subsequent wireless data transmitting procedure.

606, after all access points in the controller group have transmitted training sequences, generating the prior information according to receive signal strength indicator transmitted by each access point.

In another possible implementation, if the wireless local area network includes a plurality of access point clusters, then the first controller generates prior information in an initialization phase according to receive signal strength indicators reported by access points controlled by the first controller, where the prior information is used for generating a scheduling scheme for a first scheduling period and a second scheduling period;

Subsequently, it also needs to negotiate with other controllers in the controller group to determine the scheduling scheme for an access point cluster corresponding to each controller for the first scheduling period and the second scheduling period.

This step specifically includes:

each controller notifies the other controllers in the controller group of the scheduling scheme for the access point cluster corresponding to the controller;

according to the receive signal strength indicators received in the initialization phase, each controller determines whether there are overlapped coverage areas between an access point cluster to which the controller belongs and access point clusters to which the other controllers belong;

Optionally, when any access point in an access point cluster to which an controller belongs receives a training sequence transmitted by an access point in another access point cluster, and the received receive signal strength indicator of the training sequence exceeds a preset threshold, it is determined that there is an overlapped coverage area between the two access point clusters.

If there isn't any overlapped coverage area, then a current scheduling scheme is determined as the scheduling scheme for the first scheduling period and the second scheduling period.

If there are overlapped coverage areas, then each controller analyzes scheduling schemes transmitted by other controllers, and determines collision probabilities between the scheduling scheme for the access point cluster of the controller itself and the scheduling schemes for the other access point clusters according to the scheduling scheme;

setting a priority for the controller when a collision probability exceeds a set threshold;

optionally, a priority is set according to quantity of data waiting to be transmitted by the access points in each access point cluster when the collision probability exceeds the set threshold.

Subsequently, query different access point clusters having a collision, and adjust scheduling schemes for access point clusters with relatively low priorities.

In another possible implementation, if the wireless local area network includes a plurality of access point clusters, then after step 403 of FIG. 4, that is, generating the scheduling scheme for the plurality of access points for the next scheduling period according to the performance statistical information, further including:

exchanging, by the first controller, information with other controllers in a controller group, where the controller group includes at least two connected controllers, and the exchanged information includes the scheduling scheme for the next scheduling period generated by the controller; and modifying the scheduling scheme for the next scheduling period according to the data of overlapped coverage areas between the access points in the first access point cluster and access points in other access point clusters.

According to the above-described embodiments, before a network running state, prior information is obtained through a training sequence transmitting/listening procedure under the scheduling of a controller; then, in the network running state, complexity of a scheduling algorithm is simplified by taking the prior information as an input parameter.

Figure 7:
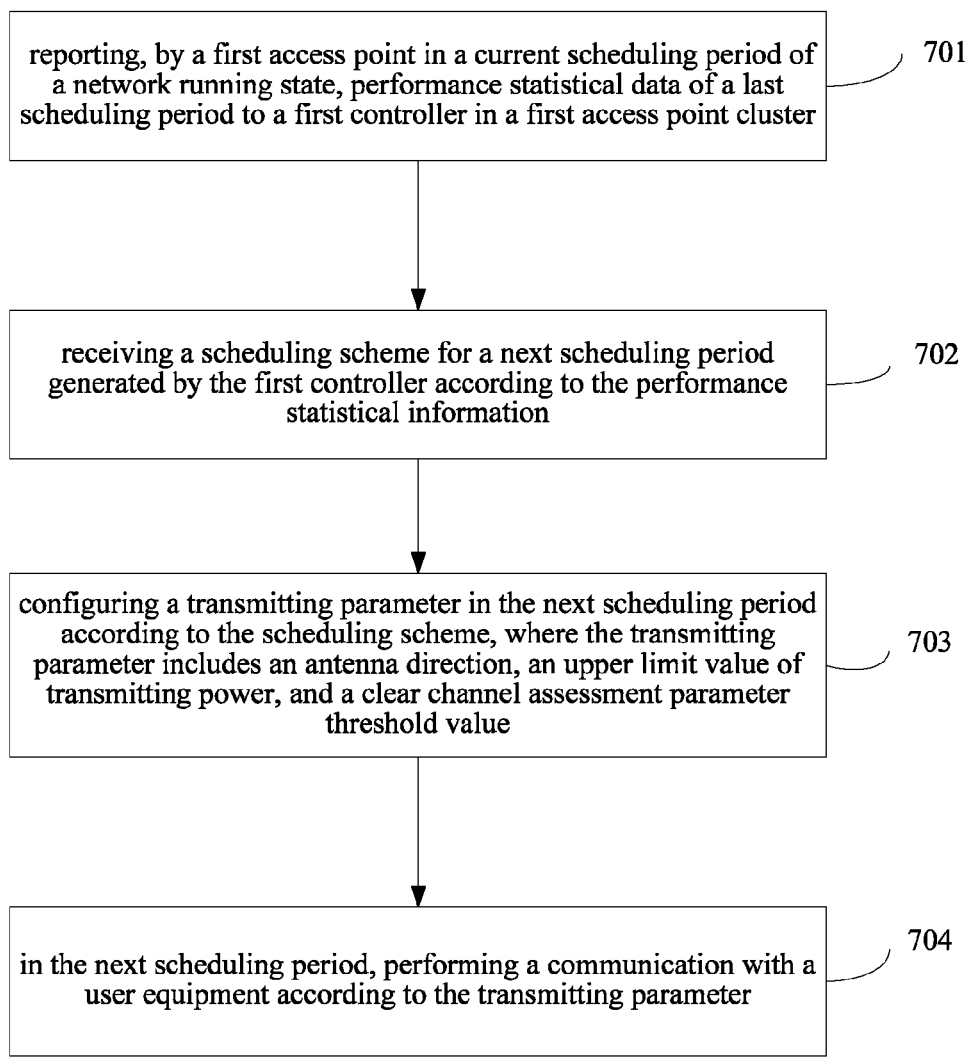
FIG. 7 is a flow chart of a scheduling method of a wireless local area network according to an embodiment of the present invention.

FIG. 7 is a flow chart of a scheduling scheme for a wireless local area network according to another embodiment of the present invention, where an entity executing this embodiment is any access point in the wireless local area network, it can be seen from FIG. 7 that, the method includes:

701, reporting, by a first access point in a current scheduling period of a network running state, performance statistical data of a last scheduling period to a first controller in a first access point cluster, where the first access point cluster includes the first controller and a plurality of access points connected to the first controller;

The first controller is a controller in a local area network, a controller controls at least two access points, and a controller and all access points controlled by the controller form an access point cluster. If the controller is also interconnected with other controllers via an interconnected device such as a switch, then the interconnected controllers form a controller group, and each of the controllers belongs to an access point cluster respectively.

It should be understood that, terms such as the first access point, the first access point cluster and the first controller are merely intended for convenience of description, and should not be interpreted as a limitation to embodiments of the present invention.

Specifically, in this embodiment, there is only one access point cluster in the wireless local area network. According to system configuration of the wireless local area network, working time of the wireless local area network in a normal running state is divided into consecutive scheduling periods, and a transmitting parameter is configured according to different scheduling schemes in different scheduling periods. In each scheduling period, an access point reports performance statistical data of a last scheduling period to a corresponding controller, where the performance statistical data includes but is not limited to following information of each access point in the last scheduling period: throughput, an average length of a backoff window, an average length of a transmit data cache queue, average receive signal strength indicator (RSSI) of received uplink signals from a user equipment, and an average RSSI of broadcast frames received from other access points. After receiving the performance statistical information reported by the access points in the access point cluster, the controller generates a scheduling scheme for a next scheduling period according to the performance statistical information.

702, receiving a scheduling scheme for a next scheduling period generated by the first controller according to the performance statistical information;

Specifically, the scheduling scheme may be a group of parallel configuration matrices, where each configuration matrix corresponds to one access point, and an element in each configuration matrix represents a parameter, which includes but is not limited to an antenna configuration parameter, a transmitting power parameter, a clear channel assessment (CCA) parameter and an access point on and off parameter, where the antenna configuration parameter is used for adjusting an antenna beam direction of an access point, the transmitting power parameter is used for controlling an intensity of transmitting power, the CCA parameter is a physical layer receiving sensitivity threshold of a wireless local area network device, for instance, CCA=−60 dBm indicates that the wireless local area network access device determines that a current channel is in a busy state when an intensity of wireless signals received by the access device is greater than or equal to −60 dBm, then the wireless local area network access device performs a backoff algorithm according to a carrier sense multiple access with collision avoidance (CSMA/CA) rule, and stops transmitting data during the period that the channel is busy; the access point on and off parameter is to control an access point to be silent or be able to transmit data in a scheduling period.

703, configuring a transmitting parameter in the next scheduling period according to the scheduling scheme, where the transmitting parameter includes an antenna direction, an upper limit of transmitting power, and a clear channel assessment parameter threshold;

Specifically, the access point configures the transmitting parameters in the next scheduling period according to the received scheduling scheme, e.g., an antenna beam direction, a transmitting power, a CCA parameter, a status such as silence or transmitting, and details will not be repeated herein.

704, in the next scheduling period, performing a communication with a user equipment according to the transmitting parameter.

Specifically, after configuring the transmitting parameter, if the access point keeps silent, it will not transmit data to any user equipment, but only keep staying in a listening state;

If a function of transmitting data is turned on, then a communication with a user equipment needs to be performed according to an antenna beam direction corresponding to the scheduling scheme, since the antenna beam direction is optimized, then impact on other access points can be reduced.

The intensity of transmitting power can ensure quality of communications with the user equipment, and the CCA parameter ensures that the access point can perform a better backoff algorithm.

By means of the above-described embodiments, different access points in an access point cluster are enabled to reduce interferences therebetween according to a constantly optimized scheduling scheme, thereby improving network throughput.

Correspondingly, in a preferred implementation, before the network running state, the wireless local area network needs to perform an initialization action, during the initialization procedure, forming of an access point cluster of the local area network is completed. After the forming of the access point cluster, receive signal strength indicators which are generated based on a training sequences transmitted by other access points are transmitted to a controller, so that the controller generates prior information according to the receive signal strength indicators, where the prior information is used to generate a scheduling scheme for a first scheduling period and a second scheduling period, and the first scheduling period and the second scheduling period are a first one and a second one scheduling periods in the running state.

More specifically, the initialization step further includes:

The first access point is connected to the first controller, where a plurality of access points connected to the first controller form a first access point cluster;

Specifically, the controller may find MAC address information of a group of access points via a switch, and establish connection relations with the group of APs through signaling interactions to form an access point cluster.

Listen to broadcast information transmitted by the first controller;

Specifically, after the access point cluster is formed, the controller generates an initialized parallel interference matrix, and instructs access points in the access point cluster to take turns to transmit a training sequences based on different configurations.

If the broadcast information notifies the first access point to transmit a training sequence, then the first access point generates and transmits a training sequence;

More specifically, according to the received broadcast information, the selected AP may configure an antenna direction by invoking an external program interface of an antenna array, configure a CCA threshold via a CCA control module, configure a power level via a power control module, and generate a training sequence via a training sequence generator (323), then, a baseband signal processor completes the subsequent wireless data transmitting procedure.

If the broadcast information does not notify the first access point to transmit a training sequence, then the first access point listens to a wireless channel, and transmits receive signal strength indicator of a training sequence to the first controller after receiving the training sequence transmitted by other access points in the first access point cluster, so that the first controller generates the prior information according to receive signal strength indicator transmitted by each access point after all access points in the first access point cluster have transmitted a training sequence.

The controller switches to another AP to transmit a training sequence at interval till all APs in the access point cluster have transmitted training sequences, and generates the prior information according to receive signal strength indicator transmitted by each access point, where the prior information is specifically a parallel interference matrix, which may act as an input parameter when generating a scheduling scheme.

Similarly, if the wireless local area network includes a plurality of access point clusters, then each access point in each access point cluster needs to perform the above actions, which is similar to this embodiment, details will not be repeated herein.

By means of the above-described embodiments, the impact on other access points due to communications between different access points and a user equipment can be reduced in a wireless local area network with a plurality of access points, thereby improving an access rate of the wireless local area network.

Figure 1:
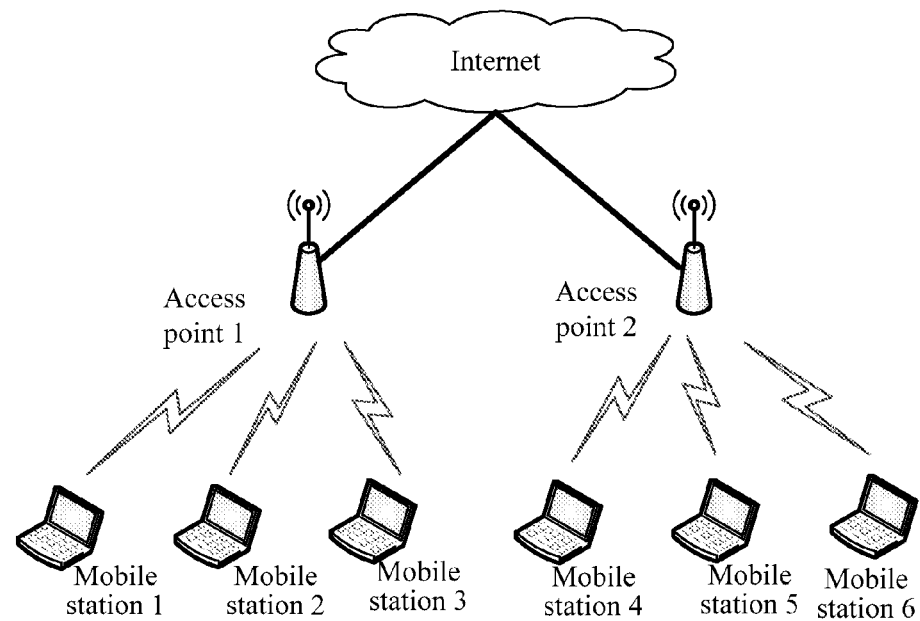
FIG. 1 is a schematic architecture diagram of a wireless local area network with a plurality of access points in the prior art.
Figure 2:
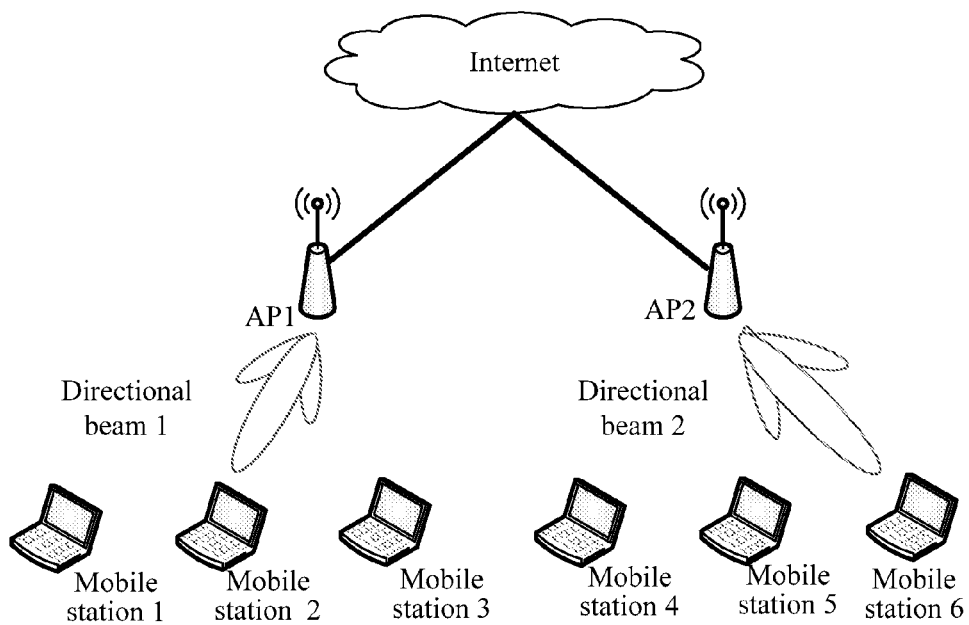
FIG. 2 is a schematic architecture diagram of performing scheduling scheme configuration only for an access point in the prior art.
Figure 3:
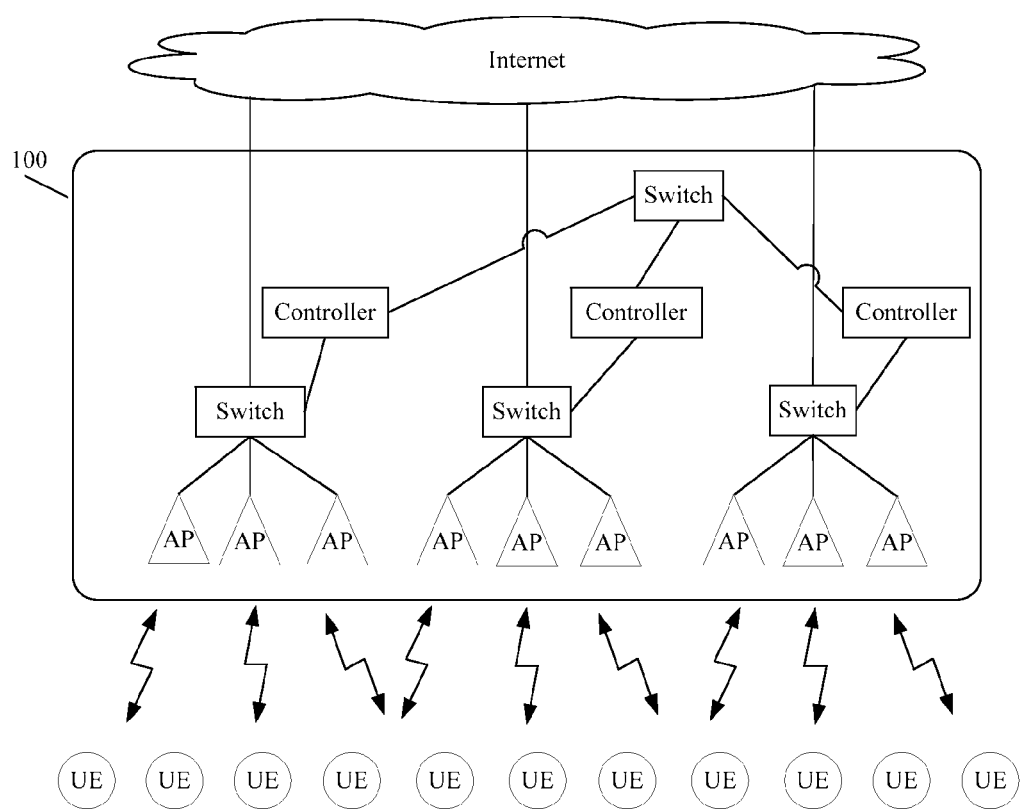
FIG. 3 is a schematic application architecture diagram of a method for scheduling an access point of a wireless local area network according to an embodiment of the present invention.

Embodiments of the present invention will be described in further detail hereunder by taking an example of interactions between a controller and an access point in a wireless local area network, this embodiment applies to the architecture as shown in FIG. 3.

In this embodiment, a workflow of the system is divided into two phases: a network initialization phase and a network running phase. In the initialization phase, network devices such as a controller, a switch and an access point are just turned on and complete a series of initialization procedures of parameter configurations and information data. The running phase refers to an entire working procedure after the initialization phase till the network devices are shut down.

Figure 8:
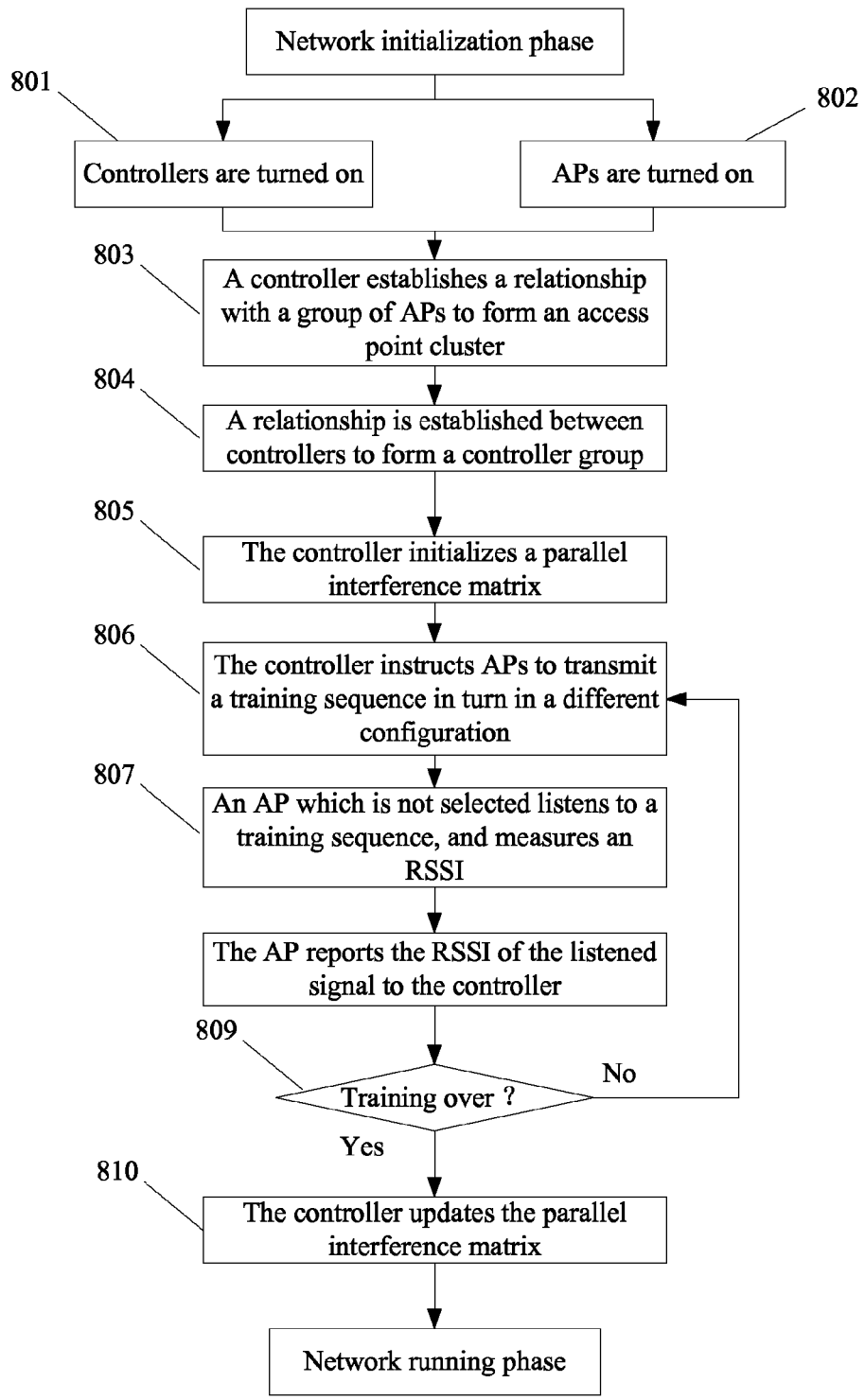
FIG. 8 is a flow chart of a scheduling method of a wireless local area network according to an embodiment of the present invention.

As shown in FIG. 8, a workflow of the network initialization phase may be divided into the following steps, this embodiment is described by taking an example that a wireless local area network includes a plurality of access point clusters, the workflow is much simpler when the wireless local area network includes only one access point cluster, and will not be repeated herein:

801, all controllers and switches in a wireless local area network are turned on and powered up to enter into a running state.

802, access points in the wireless local area network are turned on;

803, each controller finds MAC address information of a group of access points via a switch, and establishes relationships with this group of APs through signaling interactions to form an access point cluster;

By organizing a controller and a plurality of access points to form an access point cluster and organizing a plurality of access point clusters to form a large scale wireless local area network, the network building method is able to restrain controller scheduling scale and algorithm complexity and enhance adaptability of a scheduling scheme to a real-time system.

804, a controller finds MAC address information of other controllers via a switch, and establishes relationships with the other controllers around the controller through signaling interactions to form a controller group.

805, the controller initializes a parallel interference matrix.

Figure 9:
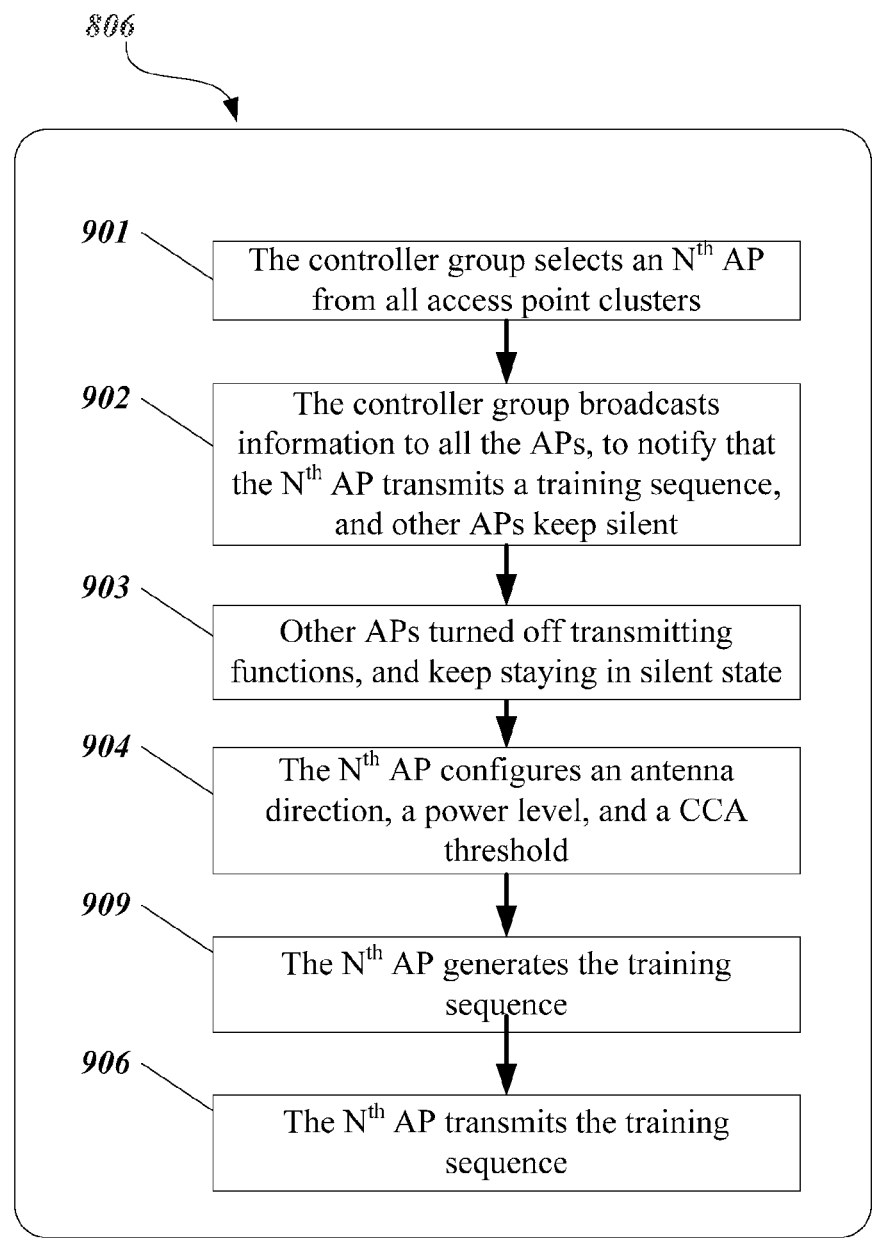
FIG. 9 is a detailed flow chart of step 806 in FIG. 8.

806, the controller instructs a selected access point to transmit a training sequence in a different configuration;

More specifically, step 806 further includes the following process, which is shown in FIG. 9.

901, a controller group numbers all APs in the wireless local area network uniformly, and selects an $N^{th}$ AP therefrom.

902, the controller group broadcasts information to all the APs to notify that the $N^{th}$ AP transmits a training sequence, and other APs keep silent.

903, after receiving the broadcast information, the APs except the $N^{th}$ AP turned off their own transmitting module, and keep staying in a silent state. During the silent period, the AP will not transmit any data packet.

904, the $N^{th}$ AP configures an antenna direction by invoking an external program interface of an antenna array, configures a CCA threshold via a CCA control module, and configures a power level via a power control module according to the received broadcast information.

905, after the transmitting parameters are configured, the $N^{th}$ AP generates a training sequence via a training sequence generator.

906, after generating the training sequence, the $N^{th}$ AP transmits the training sequence to a baseband signal processor to complete a subsequent wireless data transmitting procedure.

807, an AP which is not selected in 806 listens to the wireless channel. After receiving a training sequence from another AP, the AP measures an RSSI and saves the RSSI.

808, the AP which is not selected reports the saved RSSI to the controller (110), and the controller (110) stores the received RSSI according to a set rule.

809, the controller determines whether the training is completed, if the training is completed, then proceeds with step 810; if not, then proceeds with step 806.

More specifically, the controller may determine whether the training is completed according to whether all APs in the wireless local area network have been selected to transmit training sequences, if the training is completed, then in step 810, the controller updates the parallel interference matrix according to all received RSSI, and takes the updated parallel interference matrix as prior information, and generates a scheduling scheme for a first one and a second one scheduling period according to the prior information. If the training is not completed, then re-execute step 806 to select another AP to transmit a training sequence.

Through the training procedure in the initialization phase, the controller prepares the prior information for subsequent multi-AP joint scheduling, which helps to shorten computation time of a scheduling algorithm.

Figure 8A:
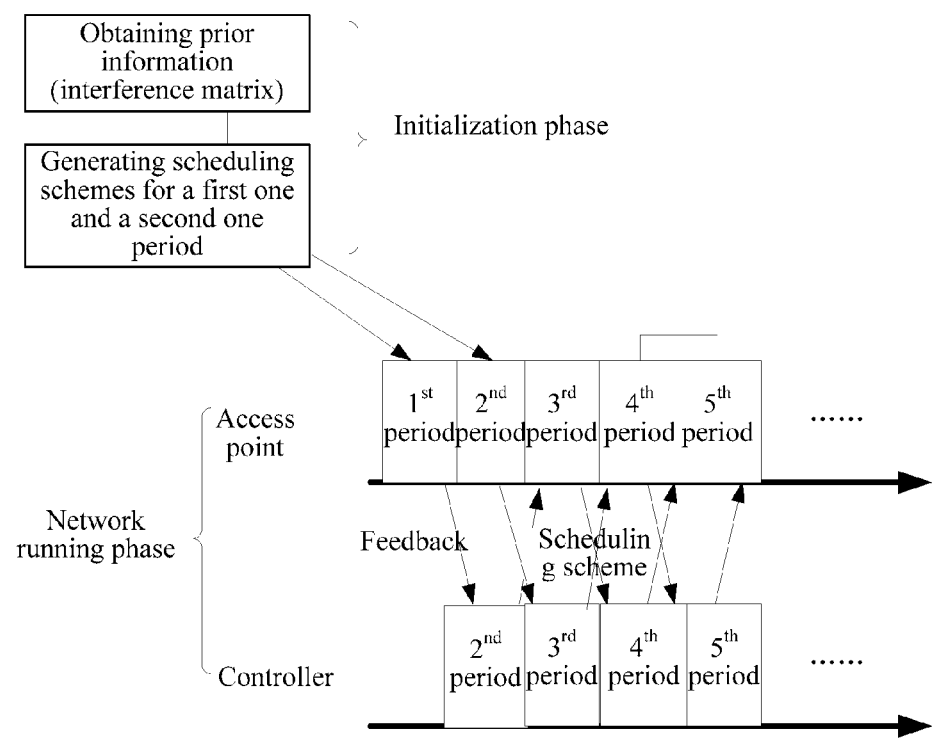
FIG. 8A is a flow chart of a scheduling method of a wireless local area network according to an embodiment of the present invention.

As shown in FIG. 8A, after the scheduling scheme for the first and the second periods is generated through the network initialization phase, enter into a network running phase.

Figure 10:
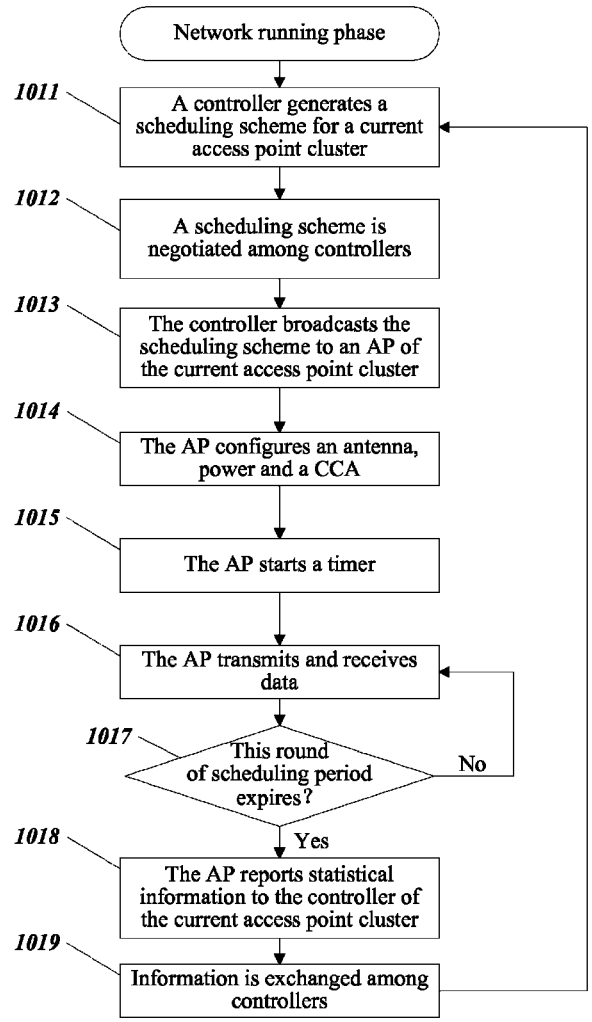
FIG. 10 is a workflow of a network running phase of a scheduling method of a wireless local area network according to an embodiment of the present invention.

As shown in FIG. 10, after the initialization ends, enter into a network running state, a workflow of a network running phase is shown in FIG. 10:

1011, a controller generates a scheduling scheme for an access point cluster to which the controller belongs according to prior information.

More specifically, input information of a scheduling algorithm of the controller includes but is not limited to: prior information of the current access point cluster and traffic load of the current access point cluster; an output result of the scheduling algorithm includes but is not limited to: whether each AP of the current access point cluster is forced to be silent, respective antenna configurations of all APs in the current access point cluster, respective upper limits of transmitting power of all APs in the current access point cluster, and respective CCA thresholds of all APs in the current access point cluster. A specific scheduling algorithm is the prior art, which thus will not be repeated herein.

Step 1012, controllers in a controller group negotiate a scheduling scheme.

Figure 11:
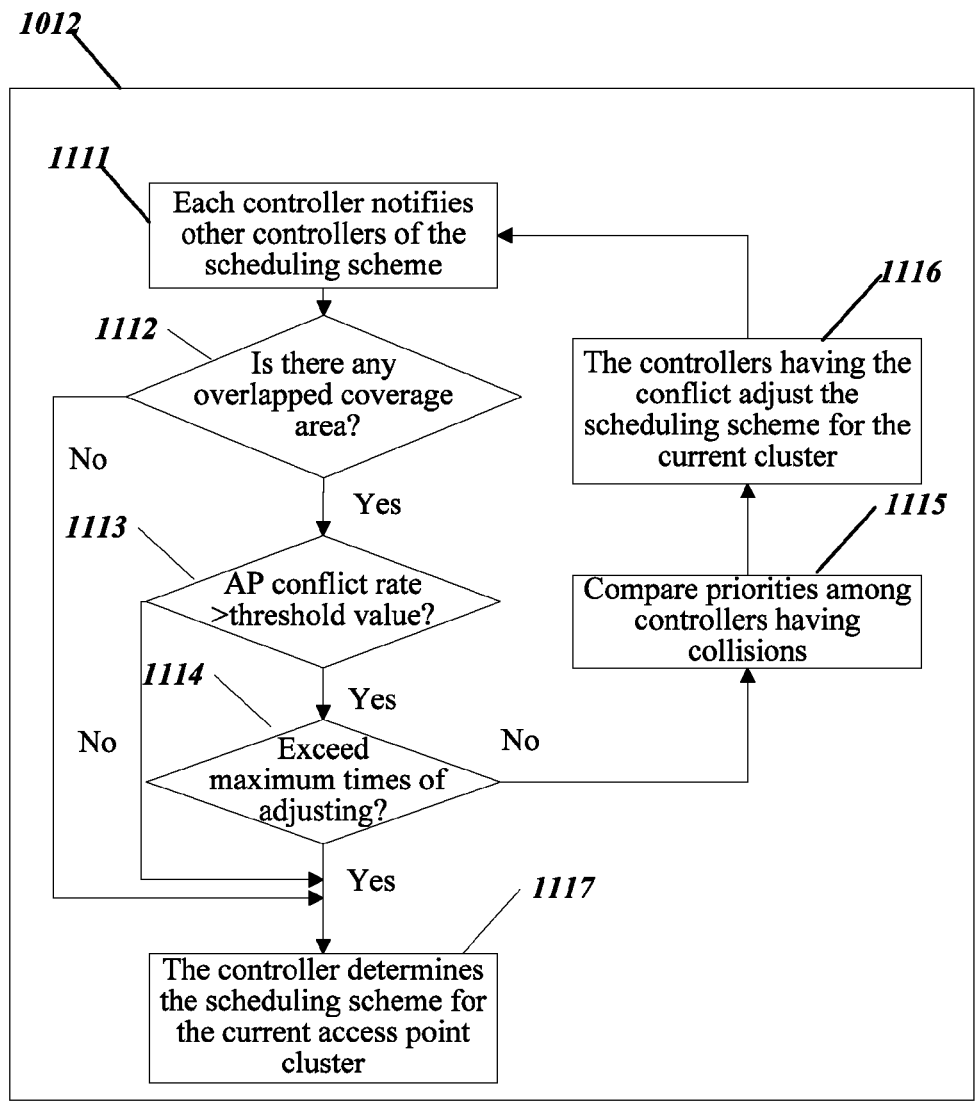
FIG. 11 is a detailed flow chart of negotiation of a scheduling scheme between controllers in a controller group.

More specifically, reference may be made to FIG. 11 for a detailed process of step 1012, as shown in FIG. 11, step 1012 further includes:

1111, each controller notifies other controllers of the scheduling scheme for the current cluster via a switch.

1112, each controller determines whether there are overlapped coverage areas between the current access point cluster and other access point clusters around the current access point cluster according to statistical information obtained through the transmission of the training sequences in the network initialization phase, if there isn't any overlapped coverage area, then proceed with step 1117 directly; if there are overlapped coverage areas, then proceed with step 1113.

Preferably, in embodiments of the present invention, the overlapped coverage area may be determined via the following rule, which is: if a training sequence wireless signal from an AP in any other access point cluster is heard by any AP in the current access point cluster, and a measured RSSI is greater than a preset threshold, then it is determined that there is an overlapped coverage area; otherwise there isn't any overlapped coverage area.

1113, each controller analyzes scheduling schemes from other controllers, and determines a collision probabilities between the 3-tuple configuration parameters <an antenna direction, a power level, a CCA threshold> of an APs of the current cluster which are in the overlapped coverage area and the 3-tuple configuration parameters <an antenna direction, a power level, a CCA threshold> of APs of the other clusters around the current cluster which are in the overlapped coverage area. If a collision probability is lower than a preset threshold, then proceed with step 1117; otherwise, proceed with step 1114.

1114, determine whether adjusting times of the scheduling scheme exceed a preset threshold M. If yes, then proceed with step 1117 directly; if not, then proceed with step 1115.

1115, compare priorities among controllers having collisions.

Preferably, a priority rule used in embodiments of the present invention is that, the larger the quantity of data waiting to be transmitted by all APs in an access point cluster, the higher the priority of the controller corresponding to this cluster is. That is, the controllers having collisions are organized from high downlink load to low downlink load. If loads of two or more controllers are exactly the same, then these controllers are organized randomly.

1116, the controllers having collisions find out APs incurring the collisions between the access point clusters according to the priorities, and adjust the scheduling scheme for the current access point cluster.

Preferably, the controller with the highest priority doesn't need to make any adjustment. After step 1116 is performed, proceed with step 1111.

Step 1117, the controller determines the scheduling scheme for all APs in the current cluster for this round of period.

After a final scheduling scheme is determined through the process as shown in FIG. 11, proceed with step 1013.

1013, the controller broadcasts the scheduling scheme to the current access point cluster.

1014, an AP in the access point cluster configures an antenna direction, an upper limit of transmitting power and a CCA threshold according to the received scheduling scheme.

1015, subsequently, the AP starts a timer to count down term of validity of the scheduling scheme.

1016, the AP performs normal data transmitting and receiving processes according to the rule.

More specifically, in a scheduling period of step 1016, the AP always keeps the antenna direction configured in step 1014 unchanged; maximum transmitting power of the AP cannot exceed the upper limit of the transmitting power configured in step 1014, but can be less than or equal to the upper limit; the CCA threshold used for determining whether a wireless channel is busy by the AP is always the CCA threshold configured in step 1014.

1017, the AP determines whether this round of scheduling period expires via the timer. If it expires, then proceed with step 1018; if it does not expire, then proceed with step 1016.

1018, when this round of scheduling period ends, the AP reports performance statistical information of this round of period to the controller in the access point cluster.

1019, controllers exchange information with each other. The information includes but is not limited to: downlink load waiting to be transmitted by the current cluster, the scheduling scheme for the current cluster for the last round of period, and actual quantity of transmitted and received data of each AP in the current cluster in the last round of period.

According to embodiments of the present invention, interferences and collisions between a plurality of access points in a cluster is reduced or even avoided through uniformly generating scheduling schemes for a plurality of access points in the cluster based on prior information by a controller, thereby overcoming deficiencies of the prior art. The interferences and collisions between access points in a cluster may also be reduced or even avoided through exchanging scheduling schemes and coordination mechanisms between controllers in different clusters, thereby overcoming the deficiencies of the prior art in further.

Figure 12:
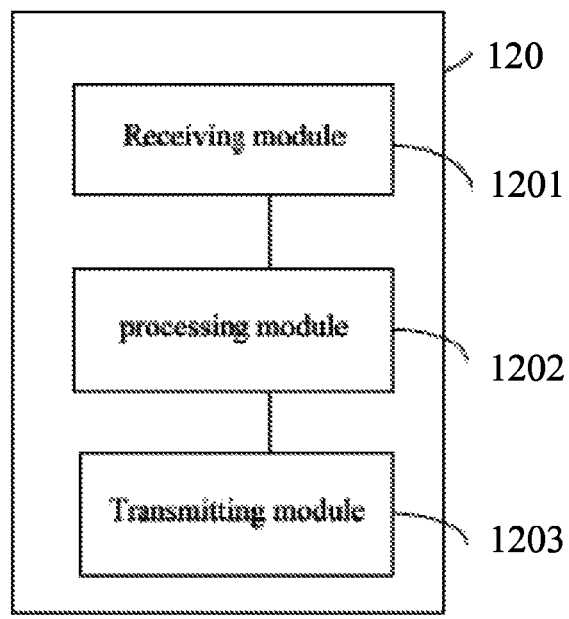
FIG. 12 is a schematic structural diagram of a scheduling controller of a wireless local area network according to an embodiment of the present invention.

Correspondingly, as shown in FIG. 12, embodiments of the present invention also provide a controller for scheduling an access point of a wireless local area network, the controller 120 includes a receiving module 1201, a processing module 1202, and a transmitting module 1203.

The receiving module 1201 is configured to receive, in a current scheduling period of a network running state, performance statistical data of a last scheduling period reported by a plurality of access points in a first access point cluster in the last scheduling period, where the first access point cluster includes the controller and the plurality of access points connected to the controller;

The processing module 1202 is configured to generate a scheduling scheme for the plurality of access points for a next scheduling period according to the performance statistical information;

The transmitting module 1203 is configured to broadcast the scheduling scheme to the plurality of access points, to enable the plurality of access points to configure, in the current scheduling period, a transmitting parameter in the next scheduling period according to the scheduling scheme, and communicate with a user equipment according to the transmitting parameter, where the transmitting parameter includes an antenna direction, an upper limit of transmitting power, and a clear channel assessment parameter threshold.

In a preferred implementation, the processing module 1202 is further configured to:

generate, in an initialization phase, prior information according to receive signal strength indicators reported by access points, where the prior information is used for generating a scheduling scheme for a first scheduling period and a second scheduling period, and the first scheduling period and the second scheduling period are a first one and a second one scheduling periods in the running state.

More specifically, the processing module 1202 is specifically configured to, in the initialization phase, establish connections with the plurality of access points to form the first access point cluster;

instruct the first access point cluster that access points in the first access point cluster take turns to transmit a training sequence, and other access points which are not instructed receive the training sequence;

receive signal strength indicator which is generated and reported by each access point based on the training sequence transmitted by other access points; and after all the access points in the access point cluster have transmitted the training sequence, generate the prior information according to the receive signal strength indicator transmitted by each access point.

In another possible implementation, if the wireless local area network includes a plurality of access point clusters, then the processing module is further configured to: in the initialization phase, form a controller group by establishing connections with other controllers, where each control device in the controller group controls an access point cluster.

In the initialization phase, the processing module is further configured to generate the prior information according to the receive signal strength indicators reported by the access points controlled by the controller, where the prior information is used for generating the scheduling scheme for the first scheduling period and the second scheduling period, then negotiate with other controllers in the controller group to determine a scheduling scheme for an access point cluster corresponding to each controller for the first scheduling period and the second scheduling period.

More specifically, the processing module 1202 is specifically configured to:

notify the other controllers in the controller group of a scheduling scheme for an access point cluster corresponding to the controller;

determine whether there are overlapped coverage areas between an access point cluster to which the controller belongs and access point clusters to which the other controllers belong according to the receive signal strength indicators received in the initialization phase;

For instance, the processing module 1202 determines that there is the overlapped coverage area between the two access point clusters, when any access point in the access point cluster to which a control belongs receives a training sequence transmitted by an access point in another access point cluster and the received receive signal strength indicator of the training sequence exceeds a preset threshold.

If there isn't any overlapped coverage area, then determine a current scheduling scheme as the scheduling scheme for the first scheduling period and the second scheduling period.

If there are overlapped coverage areas, then each controller analyzes a scheduling scheme transmitted by the other controllers, and determines collision probabilities between a scheduling scheme for the current access point cluster and the scheduling schemes for the other access point clusters according to the scheduling scheme;

set a priority for the controller when a collision probability exceeds a set threshold;

For instance, the processing module may set a priority according to quantity of data waiting to be transmitted by the access points in each access point cluster.

After setting the priority, query different access point clusters having a collision, and adjust scheduling schemes for access point clusters with relatively low priorities.

In a possible implementation, the processing module 1202 is further configured to, in the network running phase, after generating the scheduling scheme for the plurality of access points for the next scheduling period according to the performance statistical information:

exchange information with other controllers in a controller group, where the controller group includes at least two connected controllers, and the exchanged information includes the scheduling scheme for the next scheduling period generated by the controller; and modify the scheduling scheme for the next scheduling period according to data of overlapped coverage areas between the access points in the first access point cluster and access points in other access point clusters.

Figure 13:
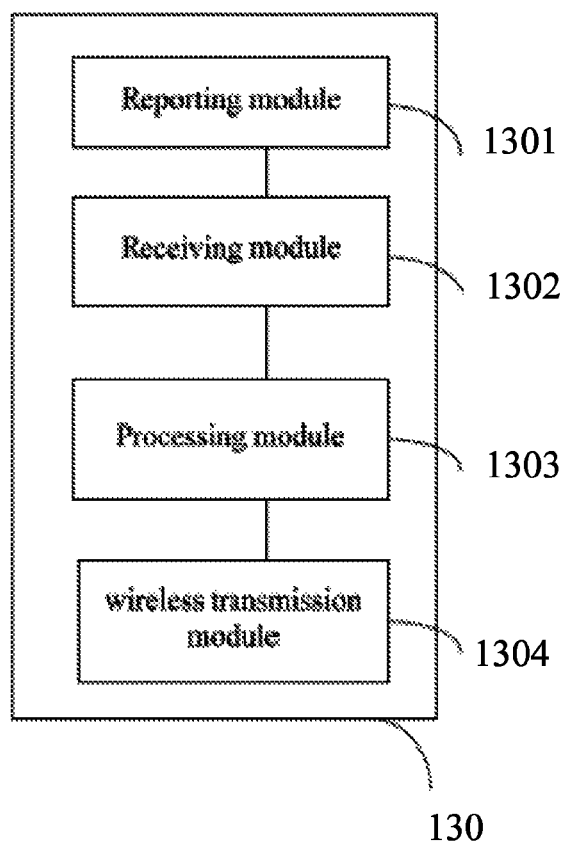
FIG. 13 is a schematic structural diagram of an access point of a wireless local area network according to an embodiment of the present invention.

Correspondingly, embodiments of the present invention also provide an access point of a wireless local area network, FIG. 13 is a schematic structural diagram of the access point, as shown in FIG. 13, the access point 130 includes:

a reporting module 1301, configured to report, in a current scheduling period of a network running state, performance statistical data of a last scheduling period to a first controller in a first access point cluster, where the first access point cluster includes the first controller and a plurality of access points connected to the first controller;

a receiving unit 1302, configured to receive a scheduling scheme for a next scheduling period generated by the first controller according to the performance statistical information;

a processing unit 1303, configured to configure a transmitting parameter in the next scheduling period according to the scheduling scheme, wherein the transmitting parameter comprises an antenna direction, an upper limit of transmitting power, and a clear channel assessment parameter threshold; and a wireless transmission unit 1304, configured to perform a communication with a user equipment according to the transmitting parameter in the next scheduling period.

In a possible implementation, the reporting unit 1301 is further configured to:

transmit, to the first controller in an initialization phase, receive signal strength indicators of training sequences transmitted by other access points controlled by the first controller, to enable the first controller to generate prior information according to the receive signal strength indicators, wherein the prior information is used for generating a scheduling scheme for a first scheduling period and a second scheduling period, and the first scheduling period and the second scheduling period are a first one and a second one scheduling periods in the running state.

Preferably, the access point also includes:

a connection establishing unit, configured to connect to the first controller, where a plurality of access points connected to the first controller form a first access point cluster;

a listening unit, configured to listen to broadcast information transmitted by the first controller; and a training sequence generating unit, configured to:

if the broadcast information notifies the access point to transmit a training sequence, generate the training sequence, and transmit the training sequence via the wireless transmission unit;

if the broadcast information does not notify the access point to transmit a training sequence, then the access point listens to a wireless channel, and transmits receive signal strength indicator of a training sequence to the first controller via the reporting unit after receiving the training sequence transmitted by other access points in the first access point cluster via the wireless transmission unit, to enable the first controller generates the prior information according to receive signal strength indicator transmitted by each access point after all access points in the first access point cluster have transmit training sequences.

According to the above-described embodiments, the impact on other access points due to communications between different access points and user equipments can be reduced in a wireless local area network with a plurality of access points, thereby improving an access rate of the wireless local area network.

Figure 14:
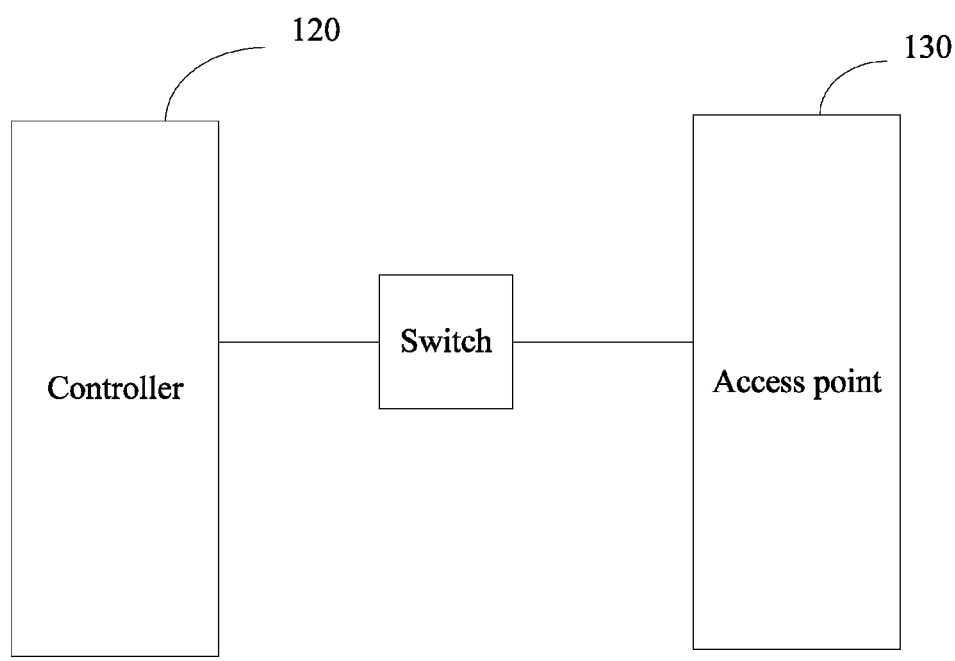
FIG. 14 is a schematic architecture diagram of a system for scheduling an access point of a wireless local area network according to an embodiment of the present invention.

Correspondingly, as shown in FIG. 14, embodiments of the present invention provide a system for scheduling an access point of a wireless local area network, including a controller 120 for scheduling an access point of a wireless local area network as shown in FIG. 12 and an access point 130 of a wireless local area network as shown in FIG. 13, where the control 120 and access point 130 are connected via a switch.

By means of the system according to embodiments of the present invention, the impact on other access points due to communications between different access points and user equipments can be reduced in a wireless local area network with a plurality of access points, thereby improving an access rate of the wireless local area network.

Figure 15:
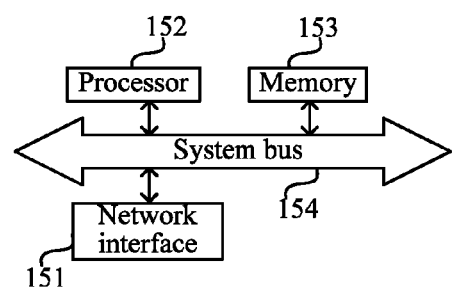
FIG. 15 is a schematic structural diagram of a controller for scheduling a wireless local area network according to an embodiment of the present invention.

Correspondingly, embodiments of the present invention also provide a controller for scheduling an access point of a wireless local area network, as shown in FIG. 15, the access point includes:

a network interface 151;

a processor 152;

a memory 153; and an application program physically stored in the memory 153, where the application program includes instructions used for causing the processor and the system to perform following procedures:

controlling, in a current scheduling period of a network running state, the network interface 151 to receive performance statistical data of a last scheduling period reported by a plurality of access points in a first access point cluster in the last scheduling period, where the first access point cluster includes the first controller and the plurality of access points connected to the controller;

generating a scheduling scheme for the plurality of access points for a next scheduling period according to the performance statistical information; and broadcasting the scheduling scheme to the plurality of access points via the network interface 151, to enable the plurality of access points to configure, in the current scheduling period, a transmitting parameter in the next scheduling period according to the scheduling scheme, and communicate with a user equipment according to the transmitting parameter, where the transmitting parameter includes an antenna direction, an upper limit of transmitting power, and a clear channel assessment parameter threshold.

Preferably, the processor 152 generates in an initialization phase, prior information according to receive signal strength indicators reported by access points controlled by the controller, where the prior information is used for generating a scheduling scheme for a first scheduling period and a second scheduling period, and the first scheduling period and the second scheduling period are a first one and a second one scheduling periods in the running state.

After generating the scheduling scheme for the plurality of access points for the next scheduling period according to the performance statistical information, the processor 152 also controls the network interface 151 to exchange information with other controllers in a controller group, where the controller group includes at least two connected controllers, and the exchanged information comprises the scheduling scheme for the next scheduling period generated by the controller; and modify the scheduling scheme for the next scheduling period according to data of overlapped coverage areas between the access points in the first access point cluster and access points in other access point clusters.

According to embodiments of the present invention, the impact on other access points due to communications between different access points and user equipments can be reduced in a wireless local area network with a plurality of access points, thereby improving an access rate of the wireless local area network.

Figure 16:
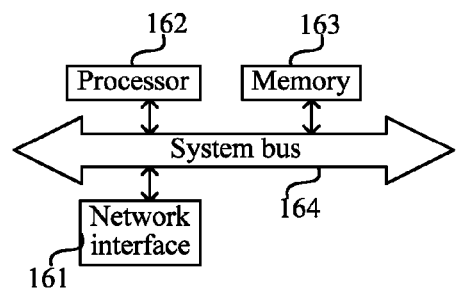
FIG. 16 is a schematic structural diagram of an access point of a wireless local area network according to an embodiment of the present invention.

Correspondingly, embodiments of the present invention also provide an access point of a wireless local area network, a structure thereof is shown in FIG. 16, and it can be seen from FIG. 16 that, the access point 160 includes:

a network interface 161;

a processor 162;

a memory 163; and an application program physically stored in the memory 163, where the application program includes instructions used for causing the processor 162 and the system to perform the following procedures:

controlling the network interface 161 to report, in a current scheduling period of a network running state, performance statistical data of a last scheduling period to a first controller in a first access point cluster, where the first access point cluster includes the first controller and a plurality of access points connected to the first controller;

receiving a scheduling scheme for a next scheduling period generated by the first controller according to the performance statistical information via the network interface 161;

configuring a transmitting parameter in the next scheduling period according to the scheduling scheme, where the transmitting parameter comprises an antenna direction, an upper limit of transmitting power, and a clear channel assessment parameter threshold; and performing a communication with a user equipment according to the transmitting parameter in the next scheduling period via the network interface.

Preferably, the application program includes instructions used for causing the processor and the network interface to perform the following procedures:

transmitting to the first controller in an initialization phase, receive signal strength indicator of training sequences transmitted by a plurality of second access points controlled by the controller via the network interface, to enable the controller to generate prior information according to the receive signal strength indicators, where the prior information is used for generating a scheduling scheme for a first scheduling period and a second scheduling period, and the first scheduling period and the second scheduling period are a first one and a second one scheduling periods in the running state.

The transmitting to the first controller in the initialization phase, the receive signal strength indicator of the training sequences transmitted by the plurality of second access points controlled by the controller via the network interface, to enable the controller to generate the prior information according to the receive signal strength indicators, specifically including:

connecting to the first controller via the network interface 161, where a plurality of access points connected to the first controller form a first access point cluster;

listening, by the network interface 161, to broadcast information transmitted by the first controller;

if the broadcast information notifies the first access point to transmit a training sequence, then generating the training sequence, and transmitting the training sequence;

if the broadcast information does not notify the first access point to transmit a training sequence, then listening, by the network interface, to a wireless channel, and transmitting receive signal strength indicator of a training sequence to the first controller after receiving the training sequence transmitted by other access points in the first access point cluster, to enable the first controller generates the prior information according to receive signal strength indicators transmitted by each access point after all access points in the first access point cluster have transmit training sequences.

Figure 17:
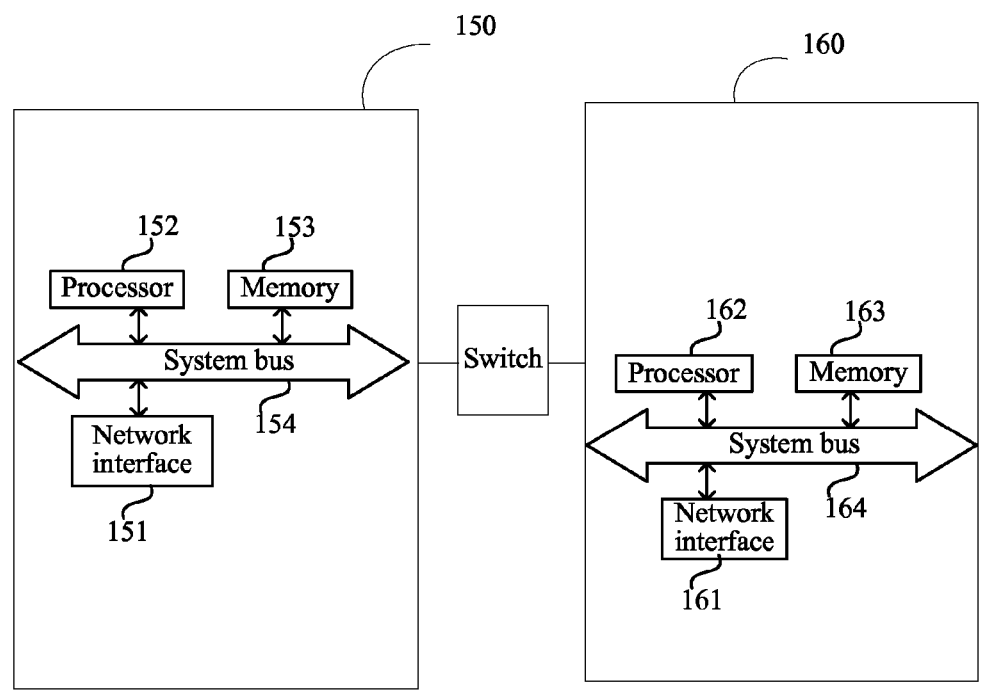
FIG. 17 is a schematic architecture diagram of a system for scheduling an access point of a wireless local area network according to an embodiment of the present invention.

Correspondingly, as shown in FIG. 17, embodiments of the present invention also provide a system for scheduling an access point of a wireless local area network, as shown in FIG. 17, the system includes a controller for scheduling an access point of a wireless local area network as shown in FIG. 15 and an access point of a wireless local area network as shown in FIG. 16, where the access point is connected the controller via a switch.

By means of the system according to embodiments of the present invention, the impact on other access points due to communications between different access points and user equipments can be reduced in a wireless local area network with a plurality of access points, thereby improving an access rate of the wireless local area network.

Figure 18:
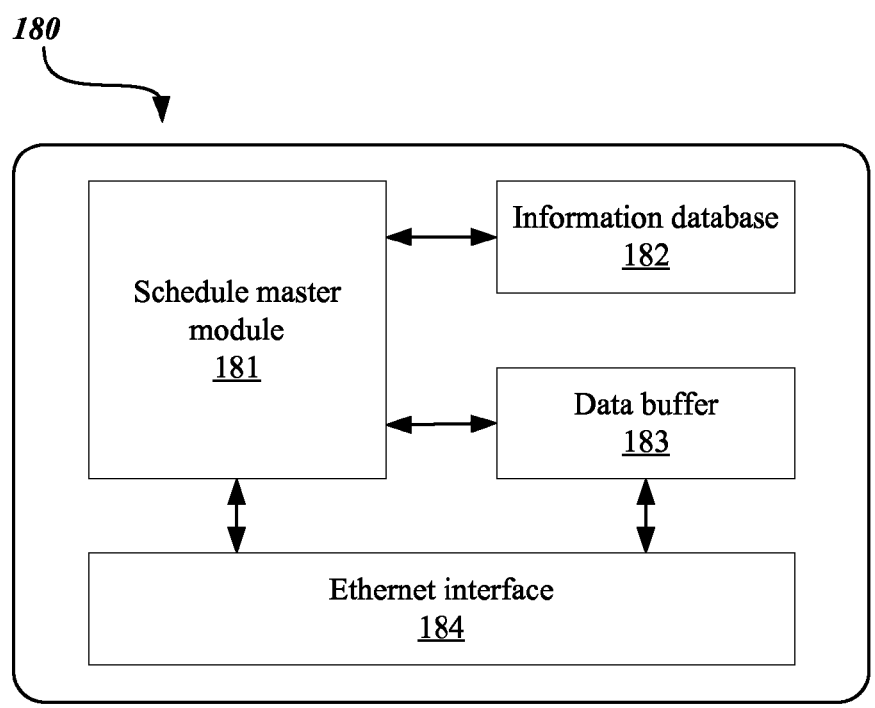
FIG. 18 is a schematic structural diagram of a scheduling controller of a wireless local area network according to an embodiment of the present invention.

In further, embodiments of the present invention also provide an implementation scheme of a controller for scheduling a wireless local area network regarding an underlying implementation, as shown in FIG. 18, the controller 180 includes but is not limited to four sub-modules: a schedule master module 181, an information database 182, a data buffer 183 and an Ethernet interface 184. The schedule master module 181 plays a role of realizing a formation and implementation procedure of a scheduling policy; the information database 182 plays a role of storing the scheduling policy and feeding back information; the data buffer 183 plays a role of caching a data packet between the Internet and an AP; the Ethernet interface 184 plays a role of connecting to other network entities.

Figure 19:
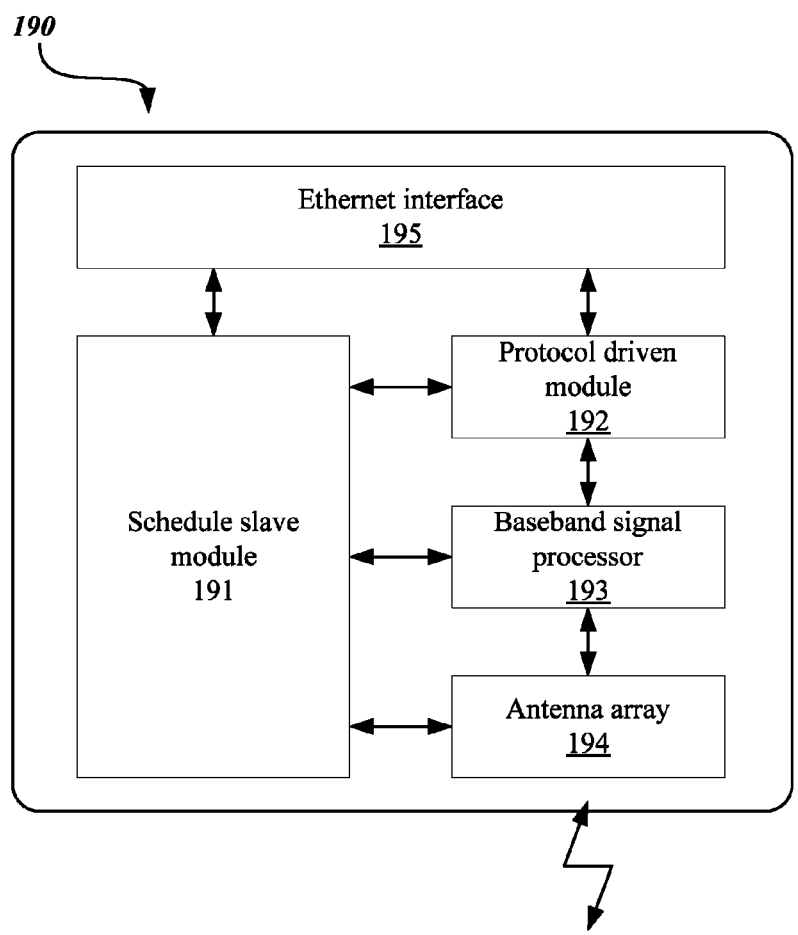
FIG. 19 is a schematic structural diagram of an access point of a wireless local area network according to an embodiment of the present invention.

Similarly, embodiments of the present invention also provide an underlying implementation of an access point, a structure thereof is shown in FIG. 19, the access point 190 includes a schedule slave module 191, a protocol driven module (Protocol Driver) 192, a baseband signal processor 193, an antenna array 194, and an Ethernet interface 195. The schedule slave module 191 plays a role of executing a scheduling command from a controller; the protocol driven module 192 plays a role of completing an MAC layer protocol configuring function; the baseband signal processor 193 plays a role of realizing a physical layer protocol configuring function; the antenna array 194 plays a role of realizing high frequency transmitting and receiving of a wireless signal; the Ethernet interface 195 plays a role of connecting to other network entities.

Figure 20:
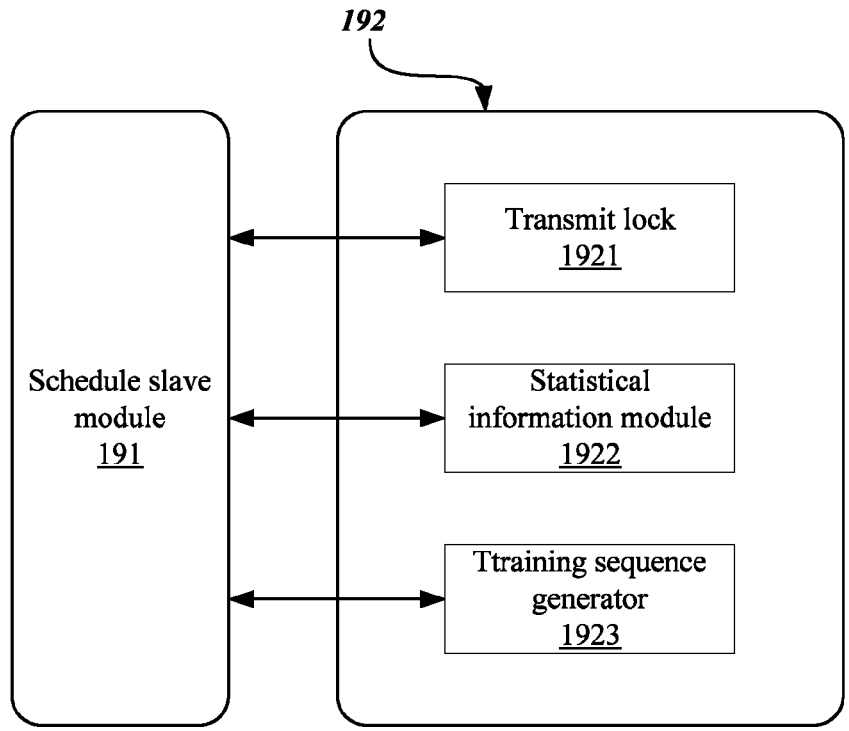
FIG. 20 is a schematic structural diagram of a protocol driven module in FIG. 19.

As shown in FIG. 20, the protocol driven module 192 of the access point may further include a transmit lock (Transmit Lock Module) 1921, a statistical information module 1922 and a training sequence generator 1923. The transmit lock 1921 accepts control from the schedule slave module 191, and dynamically turns of or turns off a transmitting function of the protocol driven module 192. The statistical information module 1922 is responsible for collecting and docketing various running data information of the protocol driven module, and reporting the statistical information to the schedule slave module 191. The training sequence generator 1923 accepts control from the schedule slave module 191, and is responsible for generating and transmitting a particular training sequence.

Figure 21:
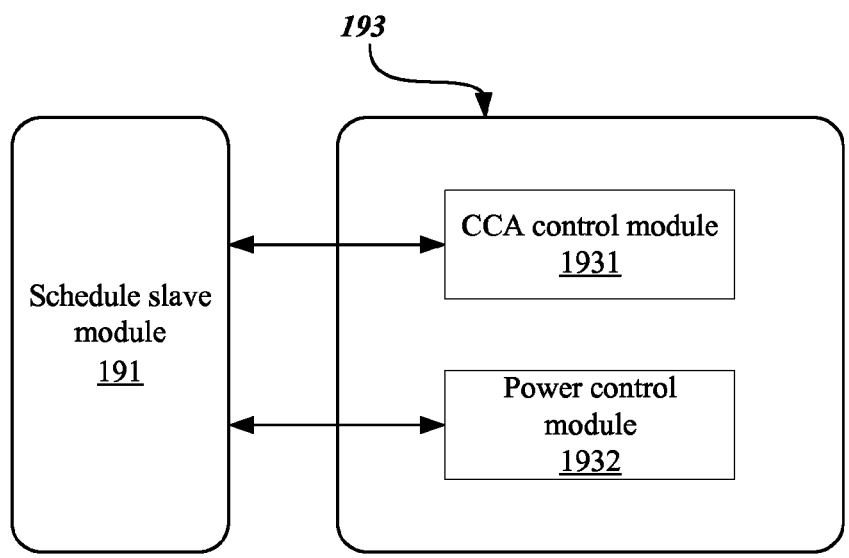
FIG. 21 is a schematic structural diagram of a baseband signal processor in FIG. 19.

As shown in FIG. 21, the baseband signal processor 193 of the access point 190 includes but is not limited to two sub-modules: a clear channel assessment parameter control module (CCA Control Module) 1931 and a power control module 1932. The CCA control module 1931 accepts control from the schedule slave module 191, and dynamically sets a CCA parameter of the baseband signal processor 193. The power control module 1932 accepts control from the schedule slave module 191, and dynamically sets transmitting power of the baseband signal processor.

The antenna array 194 of the access point 190 plays a role of accepting a configuration command from the schedule slave module (310), and dynamically enabling an antenna element, thereby achieving a wireless signal beam direction. There is an antenna element selector on the antenna array, it may receive an external program instruction, and dynamically enables or disables some antenna elements. In embodiments of the present invention, a wireless signal beam direction may be achieved by calling an external program interface of the antenna element selector.

It may be further known by persons skilled in the art that, units and algorithm steps of each example that are described with reference to embodiments disclosed herein may be implemented by electronic hardware, computer software, or a combination of electronic hardware and computer software. In order to clearly describe interchangeability of the hardware and the software, the constitution and the steps of each example have been generally described according to functions in the foregoing description. The situation that these functions are performed by hardware or software depends on specific application and a design constraint of technical solutions. Persons skilled in the art may implement the described functions by using different methods for each specific application, and such implementation should not be considered as going beyond the scope of the present invention.

Steps of the method and the algorithm that are described with reference to the embodiments disclosed herein may be implemented by electronic hardware, a processor-implemented software module, or a combination of both. The software module may be stored in a random access memory (RAM), a memory, a read only memory (ROM), an electrically programmable ROM, an electrically erasable and programmable ROM, a register, a hard disk, a removable disk, a CD-ROM, or any common storage medium of other forms in the technical field.

Objectives, technical solutions, and beneficial effects of the present invention have been described in further detail through the above-described specific implementations. It should be noted that, the above descriptions are merely specific embodiments of the present invention, but are not intended to limit the protection scope of the present invention. Any modification, equivalent replacement, or improvement made within the spirit and the principle of the present invention should fall within the protection scope of the present invention.

What is claimed is:

1. A method for scheduling an access point of a wireless local area network, comprising:
   receiving, by a first controller, in a current scheduling period of a running state of a network, performance statistical data of a last scheduling period reported by a plurality of access points in a first access point cluster, wherein the first access point cluster comprises the first controller and the plurality of access points connected to the first controller;
   generating, by the first controller, a scheduling scheme for the plurality of access points for a next scheduling period according to the performance statistical data; and
   broadcasting, by the first controller, the scheduling scheme for the next scheduling period to the plurality of access points, to enable the plurality of access points to configure, in the current scheduling period, a transmitting parameter for the next scheduling period according to the scheduling scheme and to communicate with a user equipment according to the transmitting parameter in the next scheduling periods;
   wherein the transmitting parameter comprises an antenna direction, an upper limit of transmitting power, and a clear channel assessment parameter threshold.

2. The method according to claim 1, wherein, before the network is in the running state, the method further comprises:
generating, by the first controller, in an initialization phase, prior information according to receive signal strength indicators reported by the plurality of access points, wherein the prior information is used for generating a scheduling scheme for a first scheduling period and a second scheduling period of the running state of the network.

3. The method according to claim 2, wherein generating the prior information according to the receive signal strength indicators further comprises:
establishing, by the first controller, connections with the plurality of access points to form the first access point cluster;
instructing, by the first controller, the access points in the first access point cluster to take turns to transmit a training sequence;
receiving, by the first controller, receive signal strength indicators from each access point in the first access point cluster based on the transmitted training sequences from other access points; and
generating, by the first controller, the prior information according to the received receive signal strength indicators.

4. The method according to claim 2, wherein, in the initialization phase, the method further comprises:
establishing, by the first controller, a connection with at least one second controller to form a controller group, wherein each controller in the controller group controls a respective access point cluster.

5. The method according to claim 4, wherein after generating the prior information according to the receive signal strength indicators, the method further comprises:
negotiating, by the first controller, with other controllers in the controller group to determine respective scheduling schemes for access point clusters corresponding to each controller for the first scheduling period and the second scheduling period.

6. The method according to claim 5, wherein negotiating with the other controllers further comprises:
notifying, by each controller, the other controllers in the controller group of a scheduling scheme for the access point cluster corresponding to the controller;
determining, by each controller, according to respective receive signal strength indicators received in the initialization phase, whether there are overlapped coverage areas between the access point cluster to which the controller belongs and the access point clusters to which the other controllers belong; and
determining, in response to determining that there is no overlapped coverage area, a current scheduling scheme as the scheduling scheme for the first scheduling period and the second scheduling period.

7. The method according to claim 5, wherein negotiating with the other controllers further comprises:
notifying, by each controller, the other controllers in the controller group of a scheduling scheme for the access point cluster corresponding to the controller;
determining, by each controller, according to respective receive signal strength indicators received in the initialization phase, whether there are overlapped coverage areas between the access point cluster to which the controller belongs and the access point clusters to which the other controllers belong;
in response to determining that overlapped coverage areas exist, analyzing, by each controller, scheduling schemes transmitted by the other controllers, and determining collision probabilities between the scheduling schemes for the access point clusters;
setting, by each controller, a priority for the controller when a collision probability exceeds a set threshold; and
querying different access point clusters having a collision, and adjusting scheduling schemes for access point clusters with relatively low priorities.

8. The method according to claim 7, wherein, setting the priority for each controller is based on a quantity of data waiting to be transmitted by the access points in each access point cluster.

9. The method according to claim 7, wherein, determining whether there are overlapped coverage areas further comprises:
determining there is an overlapped coverage area between two access point clusters when any access point in one access point cluster receives a training sequence transmitted by an access point in another access point cluster and a corresponding receive signal strength indicator of the training sequence exceeds a preset threshold.

10. The method according to claim 1, wherein, after generating the scheduling scheme for the next scheduling period, the method further comprises:
exchanging, by the first controller, information with other controllers in a controller group, wherein the exchanged information comprises the scheduling scheme for the next scheduling period generated by the first controller; and
modifying the scheduling scheme for the next scheduling period according to data of overlapped coverage areas between the access points in the first access point cluster and one or more access points in one or more other access point clusters.

11. A method for scheduling an access point of a wireless local area network, the method comprising:
reporting, by a first access point, in a current scheduling period of a running state of a network, performance statistical data of a last scheduling period to a first controller in a first access point cluster, wherein the first access point cluster comprises the first controller and a plurality of access points connected to the first controller, including the first access point;
receiving, by the first access point, a scheduling scheme for a next scheduling period generated by the first controller according to the performance statistical data;
configuring, by the first access point, a transmitting parameter for the next scheduling period according to the scheduling scheme, wherein the transmitting parameter comprises an antenna direction, an upper limit of transmission power, and a clear channel assessment parameter threshold; and
performing, by the first access point, a communication with a user equipment according to the transmitting parameter in the next scheduling period.

12. The method according to claim 11, wherein, before the network is in the running state the method further comprises:
transmitting, by the first access point, in an initialization phase, receive signal strength indicators corresponding to training sequences transmitted by a plurality of other access points to the first controller, to enable the first controller to generate prior information according to the receive signal strength indicators, wherein the prior information is used for generating a scheduling scheme for a first scheduling period and a second scheduling period of the running state of the network.

13. The method according to claim 12, wherein transmitting the receive signal strength indicators to the first controller further comprises:
   connecting, by the first access point, to the first controller, wherein a plurality of access points connected to the first controller form a first access point cluster; and
   listening to broadcast information transmitted by the first controller.

14. The method according to claim 13, further comprising:
   in response to the broadcast information notifying the first access point to transmit a training sequence, generating the training sequence, and transmitting the training sequence.

15. The method according to claim 13, further comprising:
   in response to the first access point not being notified to transmit a training sequence, listening, by the first access point, to a wireless channel, and transmitting receive signal strength indicators corresponding to training sequences received from other access points to the first controller.

16. An access point of a wireless local area network, comprising;
   a non-transitory computer-readable medium having processor-executable instructions stored thereon; and
   a processor, configured to execute the processor-executable instructions to facilitate the following:
   reporting, in a current scheduling period of a running state of a network, performance statistical data of a last scheduling period to a first controller in a first access point cluster, wherein the first access point cluster comprises the first controller and a plurality of access points connected to the first controller, including the access point;
   receiving a scheduling scheme for a next scheduling period generated by the first controller according to the performance statistical data;
   configuring a transmitting parameter for the next scheduling period according to the scheduling scheme, wherein the transmitting parameter comprises an antenna direction, an upper limit of transmitting power, and a clear channel assessment parameter threshold; and
   performing a communication with a user equipment according to the transmitting parameter in the next scheduling period.

17. The access point according to claim 16, wherein the processor is further configured to execute the processor-executable instructions to facilitate:
   transmitting, in an initialization phase, receive signal strength indicators of training sequences transmitted by other access points to the first controller, to enable the first controller to generate prior information according to the receive signal strength indicators, wherein the prior information is used for generating a scheduling scheme for a first scheduling period and a second scheduling period of the running state of the network.

18. The access point according to claim 16, wherein the processor is further configured to execute the processor-executable instructions to facilitate:
   connecting the access point to the first controller, wherein a plurality of access points connected to the first controller form a first access point cluster;
   listening to broadcast information transmitted by the first controller; and
   if the broadcast information notifies the access point to transmit a training sequence, generating the training sequence and transmitting the training sequence;
   if the broadcast information does not notify the access point to transmit a training sequence, listening to a wireless channel, and transmitting receive signal strength indicators corresponding to training sequences received from other access points.

* * * * *

UNITED STATES PATENT AND TRADEMARK OFFICE
CERTIFICATE OF CORRECTION

PATENT NO. : 9,713,163 B2  
APPLICATION NO. : 14/924500  
DATED : July 18, 2017  
INVENTOR(S) : Rui Ni Page 1 of 1

It is certified that error appears in the above-identified patent and that said Letters Patent is hereby corrected as shown below:

In the Claims

Column 28, Line 64, "next scheduling periods;" should read -- next scheduling period; --.

Signed and Sealed this
Twentieth Day of February, 2018

Andrei Iancu
*Director of the United States Patent and Trademark Office*